US009583779B2

(12) United States Patent
Chiang et al.

(10) Patent No.: US 9,583,779 B2
(45) Date of Patent: Feb. 28, 2017

(54) METAL SULFIDE ELECTRODES AND ENERGY STORAGE DEVICES THEREOF

(71) Applicants: Yet-Ming Chiang, Weston, MA (US); William Henry Woodford, Cambridge, MA (US); Zheng Li, Arlington, MA (US); W. Craig Carter, Jamaica Plain, MA (US)

(72) Inventors: Yet-Ming Chiang, Weston, MA (US); William Henry Woodford, Cambridge, MA (US); Zheng Li, Arlington, MA (US); W. Craig Carter, Jamaica Plain, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 122 days.

(21) Appl. No.: 14/172,648

(22) Filed: Feb. 4, 2014

(65) Prior Publication Data

US 2014/0302370 A1  Oct. 9, 2014

Related U.S. Application Data

(60) Provisional application No. 61/903,574, filed on Nov. 13, 2013, provisional application No. 61/903,739, (Continued)

(51) Int. Cl.
   *H01M 12/08* (2006.01)
   *H01M 8/18* (2006.01)
   (Continued)

(52) U.S. Cl.
   CPC ............ *H01M 8/188* (2013.01); *H01M 8/20* (2013.01); *H01M 8/225* (2013.01); *H01M 12/08* (2013.01); *H01M 4/382* (2013.01); *Y02E 60/528* (2013.01)

(58) Field of Classification Search
   None
   See application file for complete search history.

(56) References Cited

U.S. PATENT DOCUMENTS

| 6,376,123 | B1 | 4/2002 | Chu | |
|---|---|---|---|---|
| 2010/0047671 | A1* | 2/2010 | Chiang | ............... B60L 11/1879 429/50 |

(Continued)

FOREIGN PATENT DOCUMENTS

WO    WO 2014/121276 A2    8/2014

OTHER PUBLICATIONS

Invitation to Pay Additional Fees mailed Jun. 10, 2014 for Application No. PCT/US2014/014681.
(Continued)

*Primary Examiner* — Tracy Dove
(74) *Attorney, Agent, or Firm* — Wolf, Greenfield & Sacks, P.C.

(57) ABSTRACT

The present invention generally relates to energy storage devices, and to metal sulfide energy storage devices in particular. Some aspects of the invention relate to energy storage devices comprising at least one flowable electrode, wherein the flowable electrode comprises an electroactive metal sulfide material suspended and/or dissolved in a carrier fluid. In some embodiments, the flowable electrode further comprises a plurality of electronically conductive particles suspended and/or dissolved in the carrier fluid, wherein the electronically conductive particles form a percolating conductive network. An energy storage device comprising a flowable electrode comprising a metal sulfide electroactive material and a percolating conductive network may advantageously exhibit, upon reversible cycling, higher energy densities and specific capacities than conventional energy storage devices.

13 Claims, 15 Drawing Sheets

Related U.S. Application Data filed on Nov. 13, 2013, provisional application No. 61/789,964, filed on Mar. 15, 2013, provisional application No. 61/760,436, filed on Feb. 4, 2013.

(51) Int. Cl.
*H01M 8/22* (2006.01)
*H01M 8/20* (2006.01)
*H01M 4/38* (2006.01)

(56) References Cited

U.S. PATENT DOCUMENTS

2012/0135278 A1    5/2012  Yoshie et al.
2015/0214555 A1*  7/2015  Visco .................. H01M 4/5815
                                            429/347

OTHER PUBLICATIONS

International Search Report and Written Opinion mailed Sep. 23, 2014 for Application No. PCT/US2014/014681.
Brunini et al., Modeling the hydrodynamic and electrochemical efficiency of semi-solid flow batteries. Electrochimica Acta. Mar. 2, 2012; 69:301-307.
Chen et al., Ordered mesoporous carbon/sulfur nanocomposite of high performances as cathode for lithiumsulfur battery. Electrochimica Acta. Mar. 2, 2011; 56(26):9549-9555.
Fan et al., Polysulfide flow batteries enabled by percolating nanoscale conductor networks. Nano Letters. Apr. 9, 2004; 14(4):2210-2218.
International Preliminary Report on Patentability for Application No. PCT/US2014/014681 mailed Aug. 13, 2015.

* cited by examiner

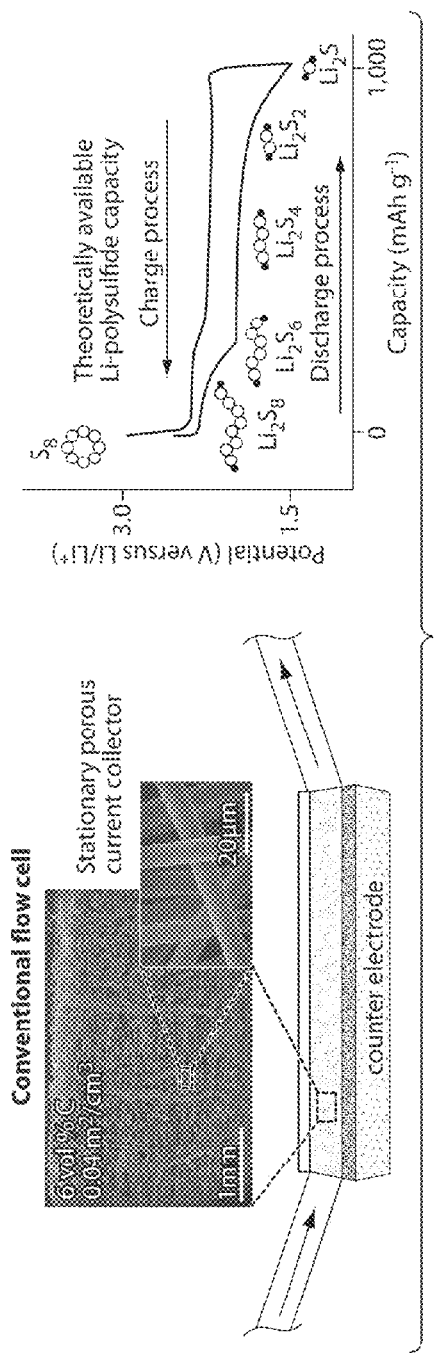
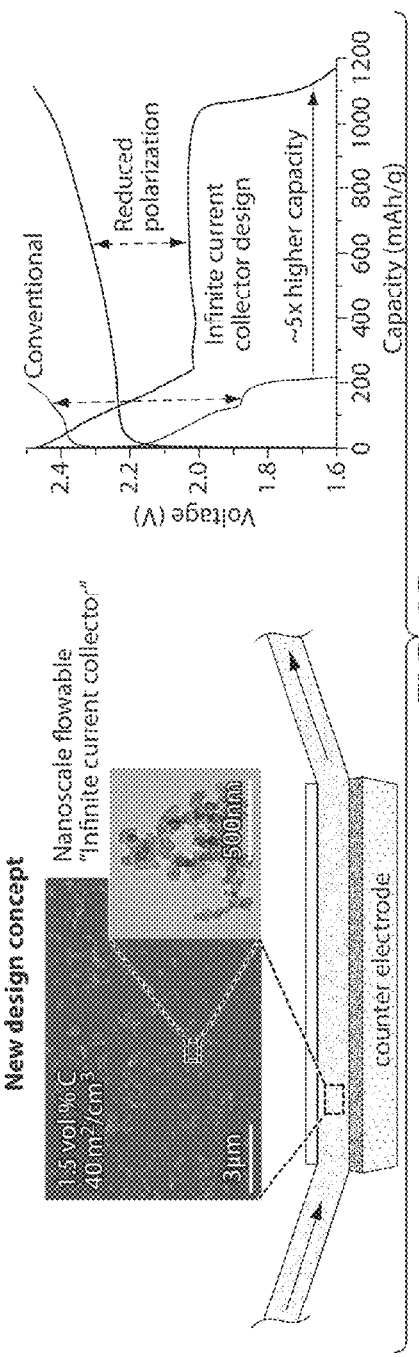
FIG. 3A
FIG. 3B

METAL SULFIDE ELECTRODES AND ENERGY STORAGE DEVICES THEREOF

RELATED APPLICATIONS

This application claims priority under 35 U.S.C. §119(e) to U.S. Provisional Patent Application Ser. No. 61/760,436, entitled "Magnesium Polysulfide Half-Flow Battery," filed Feb. 4, 2013; U.S. Provisional Patent Application Ser. No. 61/789,964, entitled "High Energy Density Semi-Solid Storage Electrodes and Batteries Thereof," filed Mar. 15, 2013; U.S. Provisional Patent Application Ser. No. 61/903,574, entitled "Metal-Polysulfide Batteries," filed Nov. 13, 2013; and to U.S. Provisional Patent Application Ser. No. 61/903,739, entitled "Metal-Polysulfide Batteries," filed Nov. 13, 2013. Each of these applications is incorporated herein by reference in its entirety.

GOVERNMENT FUNDING

The United States Government has rights in this invention pursuant to DOE-FOA-0000559, Energy Innovation Hub—Batteries and Energy Storage, and [ANL Subcontract No. 3F-31144], issued under DOE Prime Contract No. DE-AC02-06CH11357 between the United States Government and UChicago Argonne, LLC representing Argonne National Laboratory and under Grant Nos. DE-AR0000065 and DE-SC0002633 awarded by the Department of Energy. The Government has certain rights in the invention.

FIELD

The present invention generally relates to energy storage devices and, in particular, to sulfur or metal sulfide energy storage devices.

BACKGROUND

A battery stores electrochemical energy by separating an ion source and an ion sink at differing ion electrochemical potentials. A difference in electrochemical potential produces a voltage difference between the positive and negative electrodes; this voltage difference will produce an electric current if the electrodes are connected by a conductive element. In a battery, the negative electrode and positive electrode are connected by two conductive elements in parallel. Generally, the external element conducts electrons, and the internal element (electrolyte) conducts ions. Because a charge imbalance cannot be sustained between the negative electrode and positive electrode, these two flow streams supply ions and electrons at the same rate. In operation, the electronic current can be used to drive an external device. A rechargeable battery can be recharged by application of an opposing voltage difference that drives electronic current and ionic current in an opposite direction as that of a discharging battery in service. Thus, the active materials of rechargeable batteries need to be able to accept and provide ions.

Redox flow batteries are energy storage devices in which the positive and negative electrode active materials are soluble metal ions in liquid solution that are oxidized or reduced during the operation of the cell. A redox flow battery typically has tanks for separately storing the positive and negative electrode active materials, along with a current-extracting stack that comprises at least positive and negative electrode compartments separated by an ionically conductive membrane, and positive and negative current collectors that facilitate the transfer of electrons to the external circuit but do not participate in the redox reaction (i.e., the current collector materials themselves do not undergo Faradaic activity). In a redox flow battery, the total stored energy may be increased by simply increasing the size of the tanks holding the electrode active materials without increasing the amount of other components such as the separator, current collectors, and the like. However, while conventional redox flow batteries possess many attractive features, such as scalability and the ability to decouple stored energy (tanks) from power (stack), they typically have relatively low energy densities. Thus, there is a need for improved, high-energy-density energy storage devices.

SUMMARY

The present invention generally relates to energy storage devices and, in particular, to metal sulfide energy storage devices. The subject matter of the present invention involves, in some cases, interrelated products, alternative solutions to a particular problem, and/or a plurality of different uses of one or more systems and/or articles.

In one aspect, the invention is related to an electrode composition. The electrode composition comprises a sulfur or metal sulfide electroactive material suspended and/or dissolved in a fluid; and electronically conductive particles suspended in the fluid, the electronically conductive particles forming a percolating conductive network.

In another aspect, the invention is related to an electrode comprising an electrode composition comprising a sulfur or metal sulfide electroactive material suspended and/or dissolved in a fluid; and electronically conductive particles suspended in the fluid, the electronically conductive particles forming a percolating conductive network.

In another aspect, the invention is related to an electrode comprising an electroactive material comprising sulfur or a metal sulfide; and a percolating electronically conductive network comprising a plurality of electronically conductive particles, wherein the electrode is substantially fluid prior to first use.

In another set of embodiments, the invention is related to an energy storage device comprising a first electrode and a second electrode in electrochemical communication with the first electrode. The first electrode comprises an electrode composition comprising a first electroactive material comprising sulfur or a metal sulfide, wherein the first electroactive material is suspended and/or dissolved in a fluid; and electronically conductive particles suspended in the fluid, the electronically conductive particles forming a percolating conductive network.

In another set of embodiments, the invention is related to an energy storage device comprising a first electrode comprising an electrode composition comprising a first electroactive material comprising sulfur, wherein the first electroactive material is suspended and/or dissolved in a fluid, wherein the concentration of sulfur is at least about 2 M; and a second electrode in electrochemical communication with the first electrode, wherein the second electrode comprises a second electroactive material comprising an electroactive metal or metal alloy comprising a non-sulfur element.

Another aspect of the invention is related to a method of operating an energy storage device, comprising reversibly cycling the energy storage device over a voltage range of from about 0.45 V to about 2.7 V, wherein the energy storage device comprises a first electrode comprising an electroactive material comprising sulfur or a metal sulfide suspended and/or dissolved in a fluid, and a percolating electronically conductive network comprising electronically conductive particles suspended in the fluid; and a second electrode in electrochemical communication with the first electrode.

Another aspect of the invention is related to a method of operating an energy storage device, comprising reversibly cycling an energy storage device containing a flowable electrode such that a metal sulfide is precipitated and subsequently dissolved in the flowable electrode during the cycling.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 3 provides cross-sectional illustrations and plots comparing a conventional energy storage device and an energy storage device according to some embodiments of the invention;

DETAILED DESCRIPTION

The present invention generally relates to energy storage devices, and to sulfur or metal sulfide energy storage devices in particular. Some aspects of the invention relate to energy storage devices comprising at least one flowable electrode, wherein the flowable electrode comprises a sulfur or metal sulfide electroactive material suspended and/or dissolved in a fluid. In some embodiments, the flowable electrode further comprises a plurality of electronically conductive particles suspended in the fluid, wherein the electronically conductive particles form a percolating conductive network. An energy storage device comprising a flowable electrode comprising a sulfur or metal sulfide electroactive material and a percolating conductive network may advantageously exhibit, upon reversible cycling, higher energy densities and specific capacities than conventional energy storage devices.

In many conventional energy storage devices with flow-based systems (e.g., flow batteries, half-flow batteries, redox flow devices, etc.), an electrode comprising an electroactive material is flowed through or adjacent a stationary current collector. In these conventional energy storage devices, the charge transfer required for redox reactions takes place only when redox species contact the current collector surface through diffusion or fluid convection. By contrast, some embodiments of the present invention include an electrode comprising a percolating conductive network, and charge transfer may occur throughout the volume of the electrode. As a result, the available charge transfer area may significantly increase and may lead to a reduction in charge transfer resistance. Additionally, in some embodiments, an energy storage device comprising a sulfur or metal sulfide electroactive material and a percolating conductive network may be reversibly cycled into regimes where a metal sulfide is precipitated from and subsequently dissolved and/or suspended in the fluid. The ability to participate in precipitation regimes may result in higher energy densities and specific capacities than conventional redox solution-based energy storage devices, which generally cannot be reversibly cycled through such precipitation regimes.

Figure 1A:
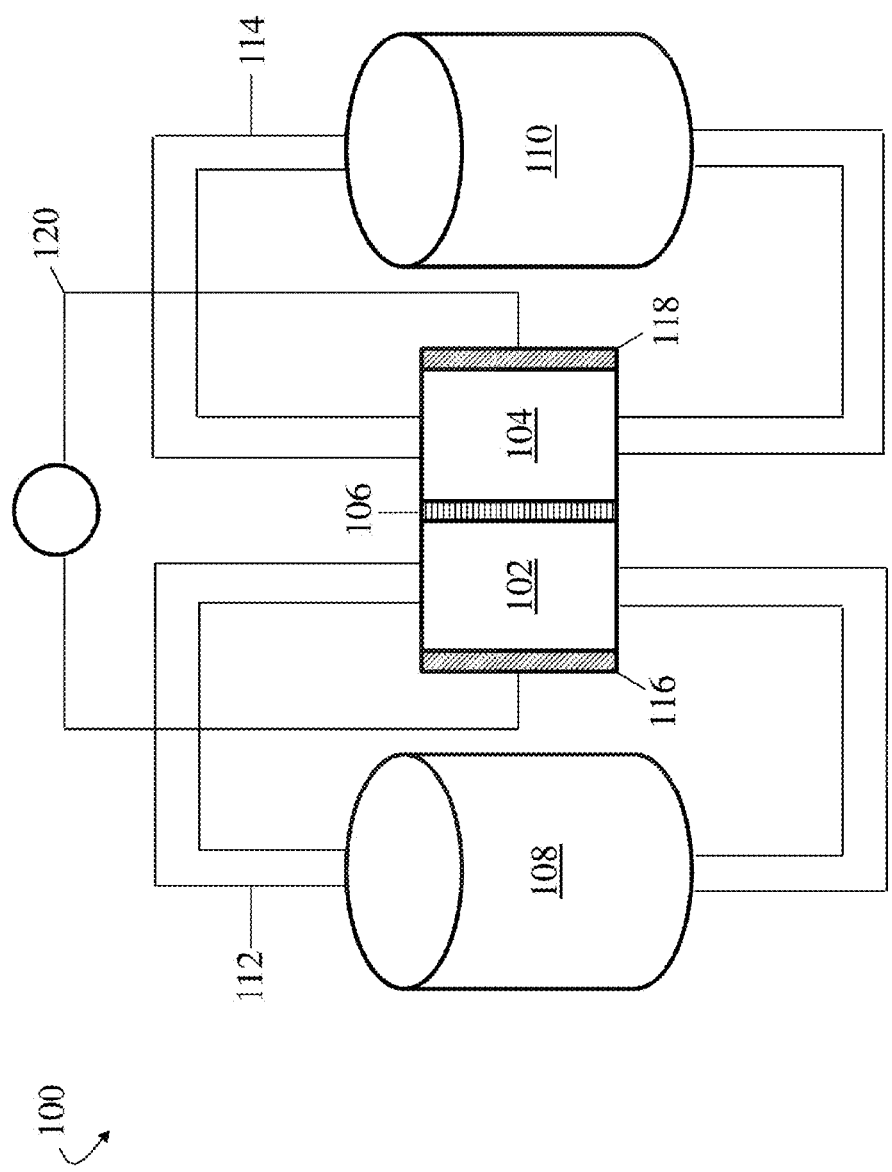
FIGS. 1A-1B provide schematic illustrations of energy storage devices in accordance with certain embodiments of the invention.

An exemplary energy storage device 100 is illustrated in FIG. 1A. Energy storage device 100 may include a first electrode compartment 102 and a second electrode compartment 104, separated by an ion-permeable separator 106. First electrode compartment 102 may be fluidly connected to a first storage tank 108 via conduit 112. A first electrode composition comprising a first electroactive material may be stored in first storage tank 108. Second electrode compartment 104 may be fluidly connected to a second storage tank 110 via conduit 114. A second electrode composition comprising a second electroactive material may be stored in second storage tank 110. First electrode compartment 102 may be in electronic communication with a first current collector 116, and second electrode compartment 104 may be in electronic communication with a second current collector 118. Current collectors 116 and 118 may be electronically connected via external circuit 120. In some embodiments, the first and second electrode compositions are flowable redox compositions that can be transported to and from the electroactive compartments, where an electrochemical reaction occurs. The first electrode composition may be a positive electrode composition, and the second electrode composition may be a negative electrode composition. Alternatively, the first electrode composition may be a negative electrode composition, and the second electrode composition may be a positive electrode composition.

In operation, the first electrode composition may be flowed from first storage tank 108 to first electrode compartment 102 via conduit 112, and the second electrode composition may be flowed from second storage tank 110 to second electrode compartment 104 via conduit 114. A transporting device may be used in some embodiments to transport the first and second electrode compositions through conduits 112 and 114. Non-limiting examples of suitable transporting devices include peristaltic pumps, piston pumps, gear pumps, gravity feed devices, and any other device for fluid transport. During discharge of energy storage device 100, in some embodiments where the first electrode composition is positive and the second electrode composition is negative, the first, positive electrode composition may undergo reduction in first electrode compartment 102, and the second, negative electrode composition may undergo oxidation in second electrode compartment 104. Ions, which may be referred to as working ions, may flow across ion-permeable membrane 106, and electrons may flow through external circuit 120 to generate current. An opposing voltage difference may be applied to energy storage device 100 to drive electronic current and ionic current in a direction opposite to that of discharging and reverse the electrochemical reaction of discharging, thus charging the first and second electrode compositions. The flow of the first and second electrode compositions through the first and second electrode compartments may be continuous or intermittent. In some embodiments, the first and second electrode compositions may be continuously renewed and replaced from first storage tank 108 and second storage tank 110.

Figure 1B:
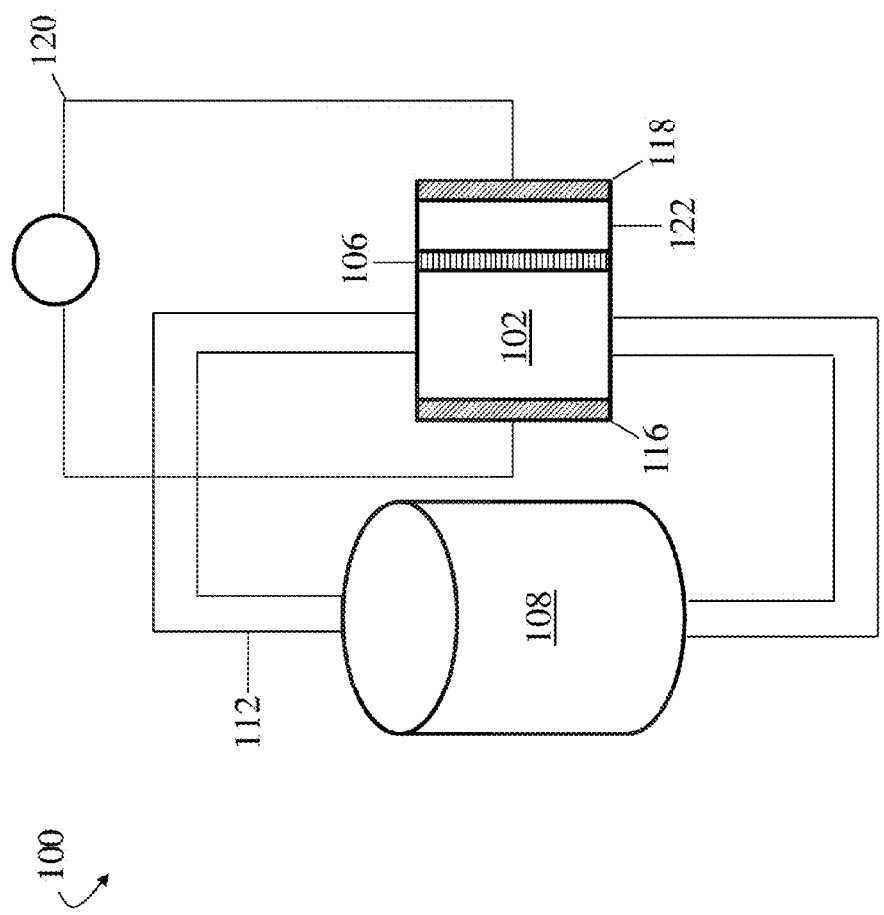

In the embodiment illustrated in FIG. 1A, both the first and second electrode compositions of energy storage device 100 are flowable. In alternative embodiments, energy storage device 100 may be a half-flow battery (also known as a semi-flow battery), with one flowable electrode composition and one non-flowable electrode composition. For example, FIG. 1B illustrates an exemplary embodiment in which energy storage device 100 comprises a first electrode compartment 102, through which a first electrode composition can flow, in ionic communication with a second electrode 122. Second electrode 122 may be substantially solid in some embodiments and, therefore, substantially non-flowable.

Referring to FIG. 1B, in a particular embodiment of energy storage device 100, the first, flowable electrode composition, which may flow through first electrode compartment 102, comprises a positive electroactive material comprising elemental sulfur, and second electrode 122 comprises a negative electroactive material comprising lithium metal. The elemental sulfur may be suspended and/or dissolved in a fluid. One of ordinary skill in the art would understand the term "elemental sulfur" to refer to sulfur in its ground oxidation state)($S^0$). In some cases, elemental sulfur is $S_8$. Similarly, one of ordinary skill in the art would understand the term "lithium metal" to refer to lithium in its ground oxidation state)($Li^0$). In this particular embodiment, discharge of energy storage device 100 may proceed by the elemental sulfur $S_8$ of the first electrode composition first being lithiated/reduced to form $Li_2S_8$, which is typically soluble in the fluid. The lithium polysulfide $Li_2S_8$ may then be further lithiated/reduced to form $Li_2S_6$, $Li_2S_4$, and $Li_2S_2$, and/or $Li_2S$, etc. During charge of energy storage device 100, the reactions may be reversed to form $Li_2S$, $Li_2S_2$, $Li_2S_3$, $Li_2S_4$, $Li_2S_6$, $Li_2S_8$, and $S_8$, etc. Generally, the discharge curve for the Li-polysulfide system exhibits at least a high voltage plateau, through which solid sulfur exists with soluble lithium polysulfides, a solution regime, in which sulfur is fully dissolved as higher-order polysulfides (e.g., $Li_2S_4$, $Li_2S_6$, $Li_2S_8$, etc.), and a low voltage plateau (precipitation regime), in which the discharge reaction proceeds via precipitation of lower-order polysulfides (e.g., $Li_2S_2$, $Li_2S$, etc.). In this embodiment, the first electrode composition may further comprise a percolating conductive network comprising carbon black. The weight ratio of carbon to sulfur may be at least about 0.1, at least about 0.2, at least about 0.3, at least about 0.4, or at least about 0.5, and/or up to about 0.6, or more. In some embodiments, the weight ratio of carbon to sulfur is less than about 0.6, less than about 0.5, less than about 0.4, less than about 0.3, or less than about 0.2, and/or down to about 0.1, or less. Combinations of any of these are also possible. In some embodiments, for example, the weight ratio of carbon to sulfur is in the range of about 0.1 to about 0.4, about 0.1 to about 0.5, about 0.1 to about 0.6, or about 0.2 to about 0.5.

Some embodiments of the invention, like the particular embodiment described above, may provide advantages over conventional prior art devices in both the solution and precipitation regimes. Without being bound by a particular theory, cycling of an energy storage device in the solution regime may be rate-limited by charge-transfer kinetics, and embodiments comprising a percolating conductive network may experience lower charge-transfer resistance than conventional energy storage devices comprising electronically-insulating redox flow compositions and stationary current collectors. In the precipitation regime, the percolating conductive network may provide greater surface area over which to deposit insoluble polysulfides, allowing an equivalent volume of polysulfide precipitate to be more thinly deposited. These advantages may allow embodiments of the invention comprising a sulfur or metal sulfide electro active material and a lithium metal anode to achieve higher specific capacities and energy densities than prior art devices. For example, in some embodiments, the specific capacity may be five times greater than the specific capacity of a conventional flow battery. As used herein, the term "specific capacity" refers to the amount of charge that can be delivered per unit mass. The term "energy density," as used herein, refers to the amount of energy stored per unit mass or per unit volume.

In some embodiments of the invention, the positive electroactive material comprises sulfur or a metal sulfide. The term "metal sulfide," as used herein, refers to chemical compounds having the formula $M_xS_y$, where M is at least one metal element, S is sulfur, x is a number between 1 and 2, and y is a number between 1 and 8. In certain cases, M represents 2 or more metal elements. Exemplary, non-limiting examples of suitable metal elements include lithium, sodium, magnesium, aluminum, zinc, manganese, titanium, and iron. In some embodiments, the metal sulfide comprises a lithium sulfide, a sodium sulfide, a magnesium sulfide, an aluminum sulfide, a zinc sulfide, a manganese sulfide, a titanium sulfide, and/or an iron sulfide. In certain cases, the metal sulfide is $Li_2S$, $Li_2S_2$, $Li_2S_3$, $Li_2S_4$, $Li_2S_6$, or $Li_2S_8$. In some embodiments, the positive electroactive material comprises elemental sulfur.

In some embodiments, the positive electroactive material comprises selenium, a mixture of selenium and sulfur, metal selenides, or mixtures of solid solutions of metal sulfides and metal selenides. As used herein, the term "metal selenide" refers to chemical compounds having the formula $M_xSe_y$, where M is at least one metal element, Se is selenium, x is a number between 1 and 2, and y is a number between 1 and 8. In certain cases, M represents 2 or more metal elements. Exemplary, non-limiting examples of suitable metal elements include lithium, sodium, magnesium, aluminum, zinc, manganese, titanium, and iron. In some embodiments, the metal selenide comprises a lithium selenide, a sodium selenide, a magnesium selenide, an aluminum selenide, a zinc selenide, a manganese selenide, a titanium selenide, and/or an iron selenide.

In some embodiments, the sulfur or metal sulfide substance present in the electrode composition is an electroactive material. As used herein, "electroactive material" refers to a material capable of participating in a reduction reaction and/or an oxidation reaction, or forming an electrical double layer in order to store capacitive charge such as in an electrochemical capacitor, or both, in order to store energy.

In some embodiments, at least a portion of the sulfur or metal sulfide electroactive material is suspended and/or dissolved in a fluid, resulting in a mixture. In certain embodiments, the electrode composition comprises a homogeneous mixture, such as a solution. In some embodiments, the electrode composition comprises a heterogeneous mixture, such as a suspension (e.g., a particle suspension, a colloidal suspension), a slurry, and/or an emulsion. Typically, a suspension comprises a dispersion of particles in a dispersion medium. In some embodiments, the colloid chemistry and rheology of the electrode composition is adjusted to produce a stable suspension from which the solid particles settle only slowly or not at all, in order to improve flowability of the electrode composition and to minimize any stirring or agitation needed to avoid settling of the electroactive particles. The stability of the suspension can be evaluated by monitoring a static suspension for evidence of solid-liquid separation due to particle settling. The electroactive material particle suspension may reach a stable state when there is no observable particle settling in the suspension, and/or no other macroscopic changes that can be observed. Typically, the stability of the electroactive material particle suspension increases with decreasing suspended particle size. In some embodiments, the electrode composition includes thickeners or binders to reduce settling and improve suspension stability. In some embodiments, the shear flow produced by pumps provide additional stabilization of the suspension. In some embodiments, the electroactive material particle suspension is stable for at least 1 day, at least 5 days, at least 10 days, or at least 30 days, etc.

The concentration of a substance in a mixture can be expressed, for example, as molarity, volume percent, and/or weight percent. In a suspension comprising particles suspended in a fluid, the molar concentration of the particles would be the number of moles of the particles present in the suspension divided by the volume of the suspension. In some embodiments, the molar concentration of sulfur in the electrode composition is at least about 1 M, at least about 2.5 M, at least about 5 M, at least about 7 M, or at least about 15 M (and/or up to about 20 M). In some cases, the molar concentration of sulfur in the electrode composition is in the range of about 1 M to about 20 M, about 2 M to about 10 M, about 5 M to about 20 M, about 10 M to about 20 M, about 15 M to about 20 M, or about 1 M to about 10 M.

In some embodiments, an electrode composition comprising a sulfur or metal sulfide electroactive material suspended and/or dissolved in a fluid further comprises a plurality of electronically conductive particles suspended in the fluid, the electronically conductive particles forming a percolating conductive network. As used herein, an "electronically conductive" material is one that is capable of transporting electronic charge carriers (e.g., electrons) and has a conductivity of at least about 0.1 mS/cm, or at least about 0.5 mS/cm in some cases. A "percolating conductive network," as used herein, refers to particles that are electronically connected, such that electronic charge carriers can be transported throughout the network. The particles themselves may be in actual physical contact with each other and/or some of the particles may not necessarily be in actual physical contact, but the particles may be positioned near enough to each other (e.g., as in a suspension) such that the particles are electronically connected and electronic charge carriers can be transported between the particles. Without being bound by a particular theory, a percolating conductive network may be formed in some embodiments by electronically conductive particles undergoing diffusion-limited aggregation (DLA). Diffusion-limited aggregation refers to a process where particles undergoing a random walk due to Brownian motion exhibit "hit-and-stick" behavior—that is, they stick to other particles they hit—and thereby aggregate to form fractal networks. Such networks may have a self-similar structure when observed at varying magnifications. The mass of a cluster of particles may vary with the characteristic size of the cluster according to a power-law relationship $M \sim R^{d_f}$ where M is the mass of the cluster, R is the characteristic size of the cluster, and $d_f$ is the fractal dimension. The fractal dimension may be measurable by means of radiative scattering techniques such as small angle x-ray scattering, as well as other methods. For example, the shear elastic modulus of a suspension containing a fractal network may scale as $G' \sim f^{(3+x/3-d_f)}$, where G' is the shear modulus, f is the volume fraction of the solid, x is the fractal dimension of the primary particles, and $d_f$ is the fractal dimension of the network. In some embodiments, the fractal dimension may be determined by the scaling of the shear modulus of the networks in the present invention. In some embodiments, the fractal dimension may be at least about 1.5, at least about 1.7, at least about 1.8, at least about 2.1, or at least about 2.2 (and/or up to about 2.5, or more). In some embodiments, the fractal dimension may be less than about 2.5, less than about 2.2, less than about 2.1, less than about 1.8, or less than about 1.7 (and/or down to about 1.5, or less). In some embodiments, the fractal dimension may be in the range of about 1.5 to about 2.5, about 1.7 to about 2.2, and/or about 1.8 to about 2.1 Typically, a percolating network has an associated percolating threshold, which may also be referred to as a percolation limit or a critical concentration, below which a percolating conductive network is not formed. For example, in some embodiments, the electrode composition is not electronically conductive below the percolation threshold, and the electrode composition is electronically conductive at or above the percolation threshold. In general, the percolation threshold may be reduced by reducing the size of the particles. Additionally, the percolation threshold may be reduced by increasing the ionic strength of the medium in which the particles are dispersed. Without being bound by a particular theory, a fluid with high ionic strength (e.g., a liquid electrolyte) may provide a particularly favorable environment for the formation of percolating networks through DLA. In a suspension, Debye-Huckel electrostatic double layers may form around each particle, which may result in interparticle repulsion. A high ionic strength fluid may screen the electrostatic double layers, thereby strengthening attractive DLA interactions (i.e., allowing van der Waals attraction to become dominant). Surprisingly, it has been found that the percolation threshold for electronically conductive particles in the fluid may be very low.

In some embodiments, the percolation threshold, as expressed in volume percent of electronically conductive particles in the electrode composition, is less than about 10 vol %, less than about 7 vol %, less than about 5 vol %, less than about 3 vol %, less than about 1 vol %, and/or down to about 0.5 vol %. In some embodiments, the percolation threshold is at least about 0.5 vol %, at least about 1 vol %, at least about 3 vol %, at least about 5 vol %, at least about 7 vol %, and/or up to about 10 vol % of electronically conductive particles. Combinations of any of these are also possible. In some embodiments, for instance, the percolation threshold is in the range of about 0.5 vol % to about 3 vol %, about 0.5 vol % to about 5%, about 0.5 vol % to about 10%, about 1 vol % to about 3%, about 1 vol % to about 5%, about 1 vol % to about 10%, about 3 vol % to about 5%, about 3 vol % to about 10%, about 5 vol % to about 7 vol %, about 5 vol % to about 10 vol %, or about 7 vol % to about 10 vol % of electronically conductive particles.

In some embodiments, the electronically conductive particles make up less than about 10 vol %, less than about 7 vol %, less than about 5 vol %, less than about 3 vol %, less than about 1.5 vol %, less than about 1 vol %, and/or down to about 0.5 vol % of the electrode composition. In some embodiments, the electronically conductive particles make up at least about 0.5 vol %, at least about 1 vol %, at least about 1.5 vol %, at least about 3 vol %, at least about 5 vol %, at least about 7 vol %, and/or up to about 10 vol % of the electrode composition. Combinations of any of these are also possible. In some embodiments, for example, the electronically conductive particles make up between about 0.5 vol % to about 1.5 vol %, about 0.5 vol % to about 3 vol %, about 0.5 vol % to about 5%, about 0.5 vol % to about 10%, about 1 vol % to about 3%, about 1 vol % to about 5%, about 1 vol % to about 10%, about 1.5 vol % to about 5 vol %, about 1.5 vol % to about 10 vol %, about 3 vol % to about 5%, about 3 vol % to about 10%, about 5 vol % to about 7 vol %, about 5 vol % to about 10 vol %, or about 7 vol % to about 10 vol % of the electrode composition.

In some embodiments, the weight ratio of the electronically conductive particles to sulfur is at least about 0.1, at least about 0.2, at least about 0.3, at least about 0.4, or at least about 0.5, and/or up to about 0.6, or more. In some embodiments, the weight ratio of the electronically conductive particles to sulfur is less than about 0.6, less than about 0.5, less than about 0.4, less than about 0.3, or less than about 0.2, and/or down to about 0.1, or less. Combinations of any of these are also possible. In some embodiments, for example, the weight ratio of the electronically conductive particles to sulfur is in the range of about 0.1 to about 0.4, about 0.1 to about 0.5, about 0.1 to about 0.6, or about 0.2 to about 0.5.

In some embodiments, the percolating conductive network may render the electrode composition both ionically and electronically conductive. Advantageously, the percolating network may allow the electrode to function as a "liquid wire" and allow charge transfer to occur throughout the volume of the electrode composition. This may, for example, increase the charge transfer rate of the electrode composition when used in an electrode in an energy storage device. By contrast, in conventional flow batteries, the electrode compositions typically comprise electronically-insulating redox fluids that only undergo charge transfer reactions upon contact with a stationary current collector.

The electronically conductive particles may comprise any electronically conductive material. In some embodiments, the electronically conductive particles comprise carbon-based particles. For example, non-limiting examples of suitable carbon-based, electronically conductive particles include carbon black particles, graphitic carbon, carbon fibers, carbon microfibers, vapor-grown carbon fibers, fullerenic carbons including "buckyballs," carbon nanotubes, multi-wall carbon nanotubes, single-wall carbon nanotubes, graphene sheets or aggregates of graphene sheets, and materials comprising fullerenic fragments. One of ordinary skill in the art would understand "carbon black" to refer to a form of carbon produced by partial combustion of hydrocarbons. In some embodiments, the electronically conductive particles comprise a metal, a metal carbide, a metal nitride, and/or a metal oxide. In some embodiments, the metal comprises platinum, palladium, iridium, gold, silver, ruthenium, tantalum, tin, aluminum, a first-row transition metal, and/or alloys comprising one or more of these elements. In some embodiments, the metal carbide comprises a carbide of a first-row transition metal, of silicon, of tin, of tantalum, a mixed-metal carbide comprising one or more of these metals, and/or a mixture of different metal carbides. In one embodiment, the metal carbide is titanium carbide. In some embodiments, the metal nitride comprises a nitride of a first-row transition metal, a mixed-metal nitride comprising one or more of these metals, and/or a mixture of different metal nitrides. In one embodiment, the metal nitride is titanium nitride. In some embodiments the metal oxide comprises an oxide of a first-row transition metal, ruthenium oxide, tin oxide, or zinc oxide. In some embodiments the conductive oxide comprises an oxide usable as a transparent conducting oxide (TCO), including but not limited to indium tin oxide (ITO). In some embodiments, the nanoscale particles are substantially spherical, and/or have an aspect ratio (largest to smallest cross-sectional dimension of the particle) of less than about 3, less than about 2, less than about 1.5, less than about 1.2, etc. In other embodiments, the nanoparticles have an aspect ratio greater than about 3 and include nanotubes, nanorods, nanowires, and nanoplatelets. The nanoscale particles may be prepared by a variety of methods including mechanical grinding, chemical precipitation, vapor phase reaction, laser-assisted reactions, and bio-assembly.

In some embodiments, the electronically conductive particles are nanoscale particles. As noted above, the small size of the electronically conductive particles may facilitate the formation of stable suspensions and/or may lower the percolation threshold. In some embodiments, the electronically conductive particles have a primary particle size of less than about 1 micrometer, less than about 500 nm, less than about 100 nm, less than about 50 nm, less than about 30 nm, or less than about 20 nm (and/or, in certain embodiments, down to about 10 nm, or less). In some embodiments, the electronically conductive particles have a primary particle size of at least about 10 nm, at least about 20 nm, at least about 30 nm, at least about 50 nm, at least about 100 nm, or at least about 500 nm (and/or, in certain embodiments, up to about 1 micrometer, or more). Combinations of these are also possible. In some embodiments, for instance, the electronically conductive particles have a primary particle size in the range of about 10 nm to about 30 nm, about 10 nm to about 50 nm, about 10 nm to about 100 nm, about 10 nm to about 500 nm, about 10 nm to about 1 micrometer, about 50 nm to about 100 nm, about 50 nm to about 500 nm, about 50 nm to about 1 micrometer, about 100 nm to about 500 nm, or about 100 nm to about 1 micrometer. The primary particle size of a non-spherical particle may be taken as the diameter of a perfect sphere having the same volume as the particle.

In some embodiments, the primary particles of the electronically conductive material are aggregated into larger agglomerates. In some embodiments, the electronically conductive particles are present in a porous aggregate with an average diameter of at least about 0.1 micrometers, at least about 0.2 micrometers, at least about 0.5 micrometers, at least about 1 micrometer, at least about 10 micrometers, at least about 50 micrometers, or at least about 100 micrometers (and/or, in certain embodiments, up to about 500 micrometers, or more). In some embodiments, the electronically conductive particles are present in a porous aggregate with an average diameter of less than about 500 micrometers, less than about 100 micrometers, less than about 50 micrometers, less than about 10 micrometers, less than about 1 micrometer, or less than about 0.5 micrometers (and/or, in certain embodiments, down to about 0.2 micrometers, or less). Combinations of these are also possible. In some embodiments, for example, the electronically conductive particles are present in a porous aggregate with an average diameter in the range of about 1 micrometer to about 10 micrometers, about 1 micrometer to about 50 micrometers, about 1 micrometer to about 100 micrometers, about 1 micrometer to about 500 micrometers, about 50 micrometers to about 100 micrometers, about 50 micrometers to about 500 micrometers, or about 100 micrometers to about 500 micrometers.

In some embodiments, the electronically conductive particles may have relatively high specific surface areas. This feature may, advantageously, increase the area available for charge transfer when electrode compositions comprising the electronically conductive particles are used in electrodes in energy storage devices. As used herein, "specific surface area" refers to surface area per unit mass or per unit volume. One method of measuring specific surface area of the electronically conductive particles is by using the Brunauer, Emmett, and Teller (BET) method. The BET method may include the steps of flowing gas over a sample, cooling the sample, and subsequently measuring the volume of gas adsorbed onto the surface of the sample at specific pressures. In some embodiments, the electronically conductive particles have a BET specific surface area of at least about 500 $m^2\ g^{-1}$, at least about 1000 $m^2\ g^{-1}$, of at least about 1400 $m^2$ $g^{-1}$, at least about 2000 $m^2\ g^{-1}$, etc.

The fluid of the electrode composition may be any ionically conductive liquid that can suspend and/or dissolve and transport the sulfur and/or metal sulfide electroactive material and the electronically conductive particles of the electrode composition. In an energy storage device comprising a first electrode comprising the electrode composition, a second electrode, and an ion-permeable separator separating the first and second electrodes, the working ions generally are the ions that are transported through the ion-permeable separator between the first and second electrodes. Examples of working ions may include, but are not limited to, $H^+$, $OH^-$, $Cl^-$, $Br^-$, $Li^+$, $Na^+$, $Ca^{2+}$, $Mg^{2+}$, $Al^{3+}$, $Zn^{2+}$, $Mn^{2+}$, $Mn^{3+}$, $Ti^{3+}$, $Ti^{4+}$, $Fe^{2+}$, and/or $Fe^{3+}$. Ionically conductive liquids typically permit transport of the working ion and have an ionic conductivity of at least about 0.1 mS/cm, or at least about 0.5 mS/cm in some cases. The ionically conductive fluid may generally be referred to as an electrolyte.

When a positive electroactive material is suspended and/or dissolved in the fluid, the fluid may be referred to as a catholyte. When a negative electroactive material is suspended and/or dissolved in the fluid, the fluid may be referred to as an anolyte. The fluid may be either aqueous or non-aqueous. Suitable non-aqueous fluids include, but are not limited to, tetraethylene glycol dimethyl ether (TEGDME), dimethyl ether (DME), diglyme, triglyme, dioxolane (DOL), tetrahydrofuran (THF), methyl-tetrahydrofuran (methyl-THF), gamma-butyrolactone (GBL), and mixtures thereof.

In some embodiments, the electrode composition may further comprise a supporting electrolyte. One of ordinary skill in the art would understand the term "supporting electrolyte" to refer to a non-electroactive ionic species. A supporting electrolyte may be added, for example, to increase the conductivity of the electrode composition. In some embodiments, the supporting electrolyte comprises a metal salt. Examples of suitable metal salts include, but are not limited to, bis(trifluoromethane)sulfonimide lithium salt (LiTFSI), lithium triflate ($LiCF_3SO_3$), sodium triflate ($NaCF_3SO_3$), lithium perchlorate ($LiClO_4$), sodium perchlorate ($NaClO_4$), lithium tetrafluoroborate ($LiBF_4$), and/or sodium tetrafluoroborate ($NaBF_4$). In some embodiments, the molar concentration of the metal salt in the electrode composition is at least about 0.1 M, at least about 0.2 M, at least about 0.5 M (and/or, in certain embodiments, up to about 1 M, or more).

Some aspects of the invention relate to an electrode comprising the electrode composition described above. In some embodiments, the electrode is flowable. That is, in some embodiments, the electrode may be substantially fluid and/or easily deformed prior to first use and/or when substantially fully charged. For example, in some embodiments, the electrode may have a measurable viscosity, and/or the electrode may tend to flow and to conform to the outline of its container, and/or the electrode may have the consistency of a paste. In some cases, the flowable electrode, after being left undisturbed for a day or less, may be observably deformed from its original shape, and in some cases, such observable deformations may occur on the time scale of minutes or seconds.

Figure 2:
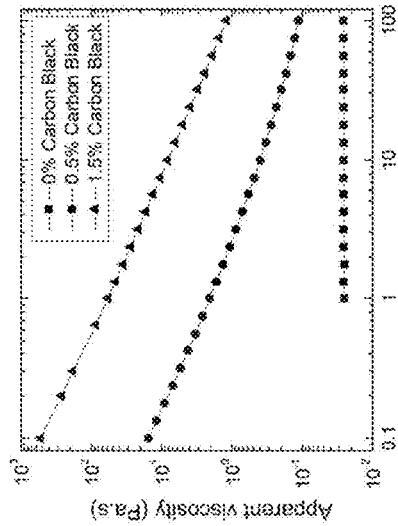
FIGS. 2A-2D provide plots of viscosity and stress as functions of shear rate for various embodiments of the invention.
Figure 2:
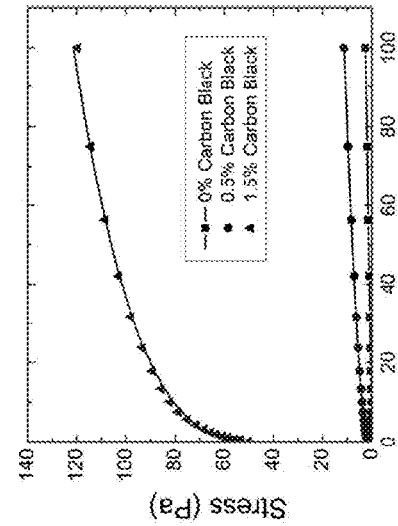
Figure 2:
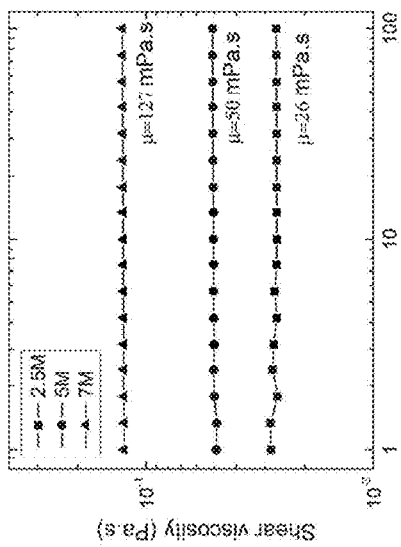
Figure 2:
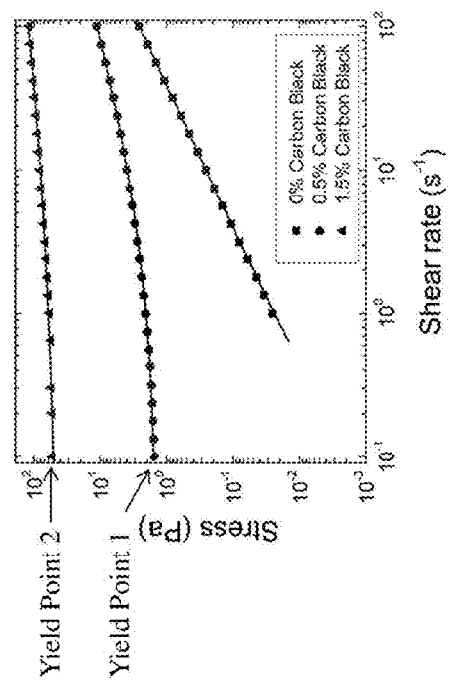

In some embodiments, the electrode exhibits the behavior of a Newtonian fluid, e.g., a fluid in which shear stress is directly proportional to shear strain rate (also referred to as shear rate) and viscosity is independent of shear rate. For example, in some cases, an electrode comprising a sulfur or metal sulfide electroactive material dissolved and/or suspended in a fluid may, in the absence of electronically conductive particles, act as a Newtonian fluid. FIG. 2A shows an exemplary log-log plot of viscosity as a function of shear rate for solutions of $Li_2S_8$ dissolved in TEGDME with 0.5 M LiTFSI. As shown in FIG. 2A, a solution comprising 2.5 M $Li_2S_8$ (indicated as squares in FIG. 2A) has a viscosity of 26 mPa-s that is constant across shear rates ranging from 1 to 100 $s^{-1}$, a solution comprising 5 M $Li_2S_8$ (indicated as circles in FIG. 2A) has a constant shear viscosity of 50 mPa-s, and a solution comprising 7 M $Li_2S_8$ (indicated as triangles in FIG. 2A) has a constant shear viscosity of 127 mPa-s. The viscosity of the electrode may be measured, for example, by using a viscometer, a torsional rheometer, and/or a capillary rheometer. In some embodiments, the viscosities may be measured at a temperature of about 25° C. In some embodiments, the viscosity of the electrode may be less than about $10^7$ mPa-s, less than about $10^6$ mPa-s, less than about $10^5$ mPa-s, less than about $10^4$ mPa-s, less than about 1000 mPa-s, less than about 800 mPa-s, less than about 500 mPa-s, less than about 200 mPa-s, less than about 100 mPa-s, less than about 50 mPa-s, or less than about 20 mPa-s, or less than about 15 mPa-s (and/or down to about 10 mPa-s, or less).

In some embodiments, the electrode exhibits the behavior of a non-Newtonian fluid, e.g., a fluid whose viscosity is dependent on shear rate. For example, an electrode comprising a sulfur or metal sulfide electroactive material dissolved and/or suspended in a fluid and electronically conductive particles suspended in the fluid may act as a non-Newtonian fluid. In some cases, the addition of even small amounts of a conductive particle may result in non-Newtonian behavior. FIG. 2B shows exemplary log-log plots of viscosity as a function of shear rate for electrolytes comprising 2.5 M $Li_2S_8$ dissolved in TEGDME with 0.5 M LiTFSI and varying concentrations of carbon black. As shown in FIG. 2B, while a solution comprising 0 vol % carbon black (squares) has a viscosity that is constant over a range of shear rates, solutions comprising 0.5 vol % (circles) or 1.5 vol % (triangles) carbon black have viscosities that vary with shear rate. In some embodiments of the invention, at a shear rate of 100 $s^{-1}$, the viscosity of the electrode may be less than about $10^7$ mPa-s, less than about $10^6$ mPa-s, less than about $10^5$ mPa-s, less than about $10^4$ mPa-s, less than about 1000 mPa-s, less than about 800 mPa-s, less than about 500 mPa-s, less than about 200 mPa-s, less than about 100 mPa-s, less than about 50 mPa-s, less than about 20 mPa-s, or less than about 15 mPa-s (and/or down to about 10 mPa-s, or less). In some embodiments, the electrode may exhibit characteristics of a Bingham plastic or fluid, e.g., a material that behaves as a rigid body below a finite shear stress (also referred to as the yield point) and as a viscous fluid above the finite shear stress. That is, a Bingham plastic material requires a shear stress exceeding the yield point before beginning to flow. The yield point may be obtained, for example, using a torsional rheometer and/or a capillary rheometer. In some cases, the yield point may be obtained from a shear stress versus shear rate flow curve using either a torsional rheometer or a capillary rheometer. In some cases, the yield point may be obtained from an oscillatory strain sweep conducted on a torsional rheometer. In some embodiments, the yield point of the electrode composition may be less than about 1 kPa, less than about 500 Pa, or less than about 100 Pa, less than about 50 Pa, or less than about 10 Pa (and/or down to about 1 Pa, or less). For example, yield points can be observed in FIG. 2C, which shows exemplary log-log plots of stress as a function of shear rate for electrolytes comprising 2.5 M $Li_2S_8$ dissolved in TEGDME with 0.5 M LiTFSI and varying concentrations of carbon black. From FIG. 2C, the yield points of a solution comprising 0.5 vol % carbon black (labeled as yield point 1) and 1.5 vol % carbon black (labeled as yield point 2). In some embodiments, the fluid may behave in a substantially Newtonian fashion above the yield point, exhibiting a constant viscosity (also referred to as "plastic viscosity"). Plastic viscosity may be a parameter of the Bingham model describing the rheology of Bingham materials. In some cases, the plastic viscosity may be less than about 2000 mPa-s, less than about 1000 mPa-s, less than about 800 mPa-S, less than about 500 mPa-s (and/or down to about 100 mPa-s, or less). In some embodiments, the fluid may exhibit shear thinning above the yield point (e.g., the viscosity of the fluid may decrease with increasing shear rate). Shear thinning may be observed, for example, in FIG. 2B, which shows that for electrolytes comprising 0.5 vol % or 1.5 vol % carbon black, viscosity decreases with increasing shear rate. FIGS. 2C and 2D, which respectively show log-log and linear plots of stress as a function of shear rate for electrolytes comprising 2.5 M $Li_2S_8$ dissolved in TEGDME with 0.5 M LiTFSI and varying concentrations of carbon black, show the behavior of electrolytes comprising 0.5 vol % or 1.5 vol % carbon black above their respective yield points.

The electrode may be electronically conductive while in its flowing and/or non-flowing states. Electronic conductivity may be measured, for example, by measuring direct current resistance. Alternatively, electronic conductivity may be measured by measuring alternating current impedance. The alternating current impedance may be measured, for example, using a cylindrical cell capped by metal plates, where the metal comprises stainless steel, nickel, gold-coated stainless steel, and/or gold-coated nickel. In some embodiments, the electronic conductivity of the electrode is at least about 0.1 mS/cm, at least about 1 mS/cm, at least about 2 mS/cm, or at least about 5 mS/cm (and/or up to about 10 mS/cm). In some cases, the electronic conductivity of the electrode is in the range of about 0.1 mS/cm to about 5 mS/cm, about 0.1 mS/cm to about 10 mS/cm, about 1 mS/cm to about 5 mS/cm, about 1 mS/cm to about 10 mS/cm, or about 5 mS/cm to about 10 mS/cm.

The electrode may be ionically conductive while in its flowing and/or non-flowing states. Ionic conductivity may be determined, for example, by measuring high-frequency impedance using an alternating current method, taking the real component of the high-frequency impedance, and correcting by a geometric cell factor. The geometric cell factor may be determined analytically and/or by experimental calibration. In some embodiments, the ionic conductivity of the electrode is at least about 0.1 mS/cm, at least about 1 mS/cm, at least about 2 mS/cm, or at least about 5 mS/cm (and/or up to about 10 mS/cm). In some cases, the ionic conductivity of the electrode is in the range of about 0.1 mS/cm to about 5 mS/cm, about 0.1 mS/cm to about 10 mS/cm, about 1 mS/cm to about 5 mS/cm, about 1 mS/cm to about 10 mS/cm, or about 5 mS/cm to about 10 mS/cm.

In some embodiments, the electrode further comprises a binder. In other embodiments, the electrode is substantially free of a binder. For example, in some cases, the concentration of a binder in the electrode may be less than about 5 wt % or less than about 2 wt % (and/or down to about 1 wt %, or less). As used herein, a binder may refer to a non-electroactive material that is neither electronically conductive nor ionically conductive.

Some aspects of the invention relate to an energy storage device comprising a first electrode and a second electrode in electrochemical communication with the first electrode. The first electrode may, in some cases, be flowable. In some embodiments, the first electrode is a positive electrode (i.e., a cathode). In certain cases, the positive electrode comprises a sulfur or metal sulfide electroactive material suspended and/or dissolved in a fluid, and electronically conductive particles suspended and/or dissolved in the fluid, the electronically conductive particles forming a percolating conductive network. In some embodiments, the second electrode is a negative electrode (i.e., an anode). The negative electrode may comprise, in some cases, an electroactive metal or a metal alloy. Non-limiting examples of suitable metals include lithium, sodium, magnesium, calcium, aluminum, zinc, manganese, titanium, and/or iron. In some cases, the negative electrode comprises a non-sulfur element of the positive electrode. The negative electrode may store the working ion(s) of the energy storage device at a more negative electrical potential than the same ion(s) in the first electrode.

In some embodiments, the energy storage device may comprise first and second current collectors for the first and second electrodes. The current collectors may be made of materials selected to be stable at the operating potentials of the first and second electrodes. Non-limiting examples of suitable current collector materials include aluminum, titanium, nickel, copper, gold, and carbon, including fibrous carbon and/or carbon felt.

The energy storage device may, additionally, comprise an ion-permeable separator between the first and second electrode compartments. The ion-permeable separator can include any suitable medium capable of allowing the working ion(s) of the energy storage device to be passed through it. In some embodiments, the ion-permeable medium comprises a membrane. The membrane can be any conventional membrane that is capable of ion transport. In some embodiments, the membrane may be a liquid-impermeable membrane that permits the transport of ions therethrough, namely a solid or gel ionic conductor. In other embodiments the membrane is a porous polymer membrane infused with a liquid that allows for the shuttling of ions between the first and second electroactive materials, while preventing the transfer of electrons. In some embodiments, the membrane is a microporous membrane that prevents particles forming the positive and negative electrode flowable compositions from crossing the membrane. Exemplary membrane materials include polyethyleneoxide (PEO) polymer in which a lithium salt is complexed to provide lithium conductivity, or Nafion membranes, which are proton conductors. For example, PEO-based electrolytes can be used as the membrane, which is pinhole-free and a solid ionic conductor, optionally stabilized with other membranes such as glass fiber separators as supporting layers. PEO can also be used as a slurry stabilizer, dispersant, etc. in the positive or negative flowable redox compositions.

The energy storage device may further comprise a layer adjacent at least one of the electrodes. The layer may, for example, prevent one of the electrodes from coming into direct contact with an electrolyte, and the layer may permit the passage of ions but not electrons. Advantageously, the layer may provide controlled passivation of the electrode against oxidation reactions (at the positive electrode) or reduction reactions (at the negative electrode) that could potentially consume working active material, increase the impedance of the electrodes, introduce safety issues, and/or degrade the electrolyte. In some embodiments, the layer comprises a metal salt. A non-limiting example of a metal salt is $LiNO_3$. In some embodiments, the layer comprises a ceramic. One of ordinary skill in the art would understand a ceramic to comprise an inorganic solid, such as an oxide, a nitride, and/or a carbide. In some embodiments, the ceramic is a solid electrolyte, an ion-conducting glass, and/or an ion-conducting crystal. In some embodiments, the ceramic is a lithium-phosphorus-oxynitride compound. In some cases, the layer comprises a polymer. One of ordinary skill in the art would understand a polymer to refer to a molecule comprising two or more monomer units covalently linked together. In some embodiments, the polymer is a solid polymer electrolyte (SPE). In some embodiments, the SPE is a block-copolymer.

Certain aspects of the invention may relate to methods of operating the energy storage device. In some embodiments, the energy storage device may be reversibly cycled over a voltage range of from about 0.45 V to about 2.7 V, from about 0.7 V to about 2.7 V, and from about 1.6 V to about 2.5 V. During the reversible cycling, a metal sulfide may be precipitated and subsequently dissolved. In particular embodiments, the metal sulfide that is precipitated and dissolved may be $Li_2S$. During cycling, the electrochemical cell may have a specific capacity (per gram of sulfur) of at least about 500 mAh/g, at least about 1000 mAh/g, or at least about 1200 mAh/g.

In some cases, the flowable electrode of the energy storage device may be in motion during at least a portion of the cycling. The flowable electrode may, in some embodiments, be subjected to continuous flow. In some cases, the flowable electrode may be subjected to intermittent flow. It has been discovered that the performance of energy storage devices can be enhanced by transporting multiple portions of an electrode composition (e.g., "plugs" of electrode composition) to the energy storage device, and charging and/or discharging the portions of the electrode composition in succession. Such an arrangement can be achieved, for example, by intermittently transporting first, second, and/or more portions of electrode compositions to an electrode compartment and operating the device such that the portion of the electrode composition proximate the electrode compartment is electrochemically isolated from upstream and downstream portions of the electrode composition.

Accordingly, in some embodiments, a first portion of an electrode composition can be transported into an electrode compartment, after which, the flow of the electrode composition can be inhibited. During and/or after inhibiting the flow of the electrode composition, the first portion of electrode composition can be at least partially charged and/or discharged while, at the same time, a second portion of the electrode composition, fluidically connected to the first portion via an open flow pathway, is not substantially charged and/or discharged. In some embodiments, after at least partially charging and/or discharging the first portion of electrode composition, the flow rate of the electrode composition can be increased. Increasing the flow rate of the electrode composition can result in the first portion of electrode composition being transported out of the electrode compartment and the second portion of electrode composition being transported into the electrode compartment. In some embodiments, after the second portion of electrode composition has been transported into the electrode compartment, flow of the electrode composition can be inhibited a second time. During and/or after inhibiting flow a second time, the second portion of electrode composition can be charged and/or discharged while the first portion (and/or a third portion) of the electrode composition is not substantially charged and/or discharged. Operation of the device can continue in this manner for any number of portions of the electrode composition. When operated in this manner, multiple "plugs" of electrochemically isolated, electrode composition can be locally charged and/or discharged and, during each charging and/or discharging step, other portions of the electrode composition are not substantially charged and/or discharged.

The systems, articles, and methods described herein can provide a variety of advantages over other energy storage devices. As one example, the use of intermittent flow (as opposed to continuous flow) can reduce the amount of energy required to transport the fluid through the electrode compartment to achieve a given state of charge. For example, in some embodiments, substantially all of the electrode composition can be charged and/or discharged to a given state of charge by intermittently transporting the electrode composition once through the electrode compartment. In some such cases, the use of a continuous flow regime might require the same fluid to be circulated through the electrode compartment multiple times (e.g., 2, 3, 4, 5, or more times) in order to achieve the same state of charge.

An international PCT application entitled "Metal Sulfide Electrodes and Energy Storage Devices Thereof," filed Feb. 4, 2014, is incorporated herewith in its entirety.

The following examples are intended to illustrate certain embodiments of the present invention, but do not exemplify the full scope of the invention.

EXAMPLE 1

In high ionic strength solutions such as liquid electrolytes, nanoscale conductor particles were observed to exhibit diffusion-limited aggregation (DLA) and form percolating networks at remarkably low concentrations, as low as 1 vol %. In several such electrolyte-nanoconductor suspensions using both nonaqueous and aqueous electrolytes, electronic conductivities of 5-10 mS/cm were obtained, providing good mixed electronic-ionic conductivity in a fluid of relatively low viscosity. A new design concept for flow battery electrodes used such suspensions to form an "infinite current collector" network in flowable redox solutions, allowing electrochemical reaction to be carried out throughout the volume of a flow electrode (FIG. 3b) rather than only at the interface between flowing redox solution and stationary porous current collector as in a conventional flow battery (FIG. 3a). This principle was applied to lithium polysulfide redox electrodes, with surprising results, an example of which is shown in FIG. 3 (lower right). For identical solutions (2.5 M $Li_2S_8$) and cell geometry and electrochemical test conditions (C/4), a nanoconductor suspension (1.5 vol % carbon) exhibited about 5 times the capacity of the conventional flow cell design (6 vol % carbon felt current collector) and reached the theoretical capacity of the solution (1200 mAh/g). The nanoconductor suspension also exhibited reduced polarization compared to the conventional flow cell.

It was noted that the discharge curve of the Li—S system has two distinct regions (FIG. 3, upper right): a higher voltage region with sloping voltage (2.5-2.1 V) over which sulfur is fully dissolved as soluble polysulfides, and a lower voltage plateau (~2.0 V) where the discharge reaction proceeds via precipitation of insoluble lower order polysulfides $Li_2S_2$ and $Li_2S$. FIG. 3 shows that the conventional porous carbon felt current collector delivered capacity primarily in the solution region. However, the capacity and energy density of the flow battery can be increased if the plateau region is utilized as well. Although many literature studies showed that the reaction is poorly reversible in this regime, the experiments and analysis below demonstrated that the "infinite current collector" approach allowed both higher capacity and significantly improved reversibility when cycled to include the precipitation regime.

"Infinite Current Collector" Had $10^3$ Times Higher Charge-Transfer Area

Figure 4:
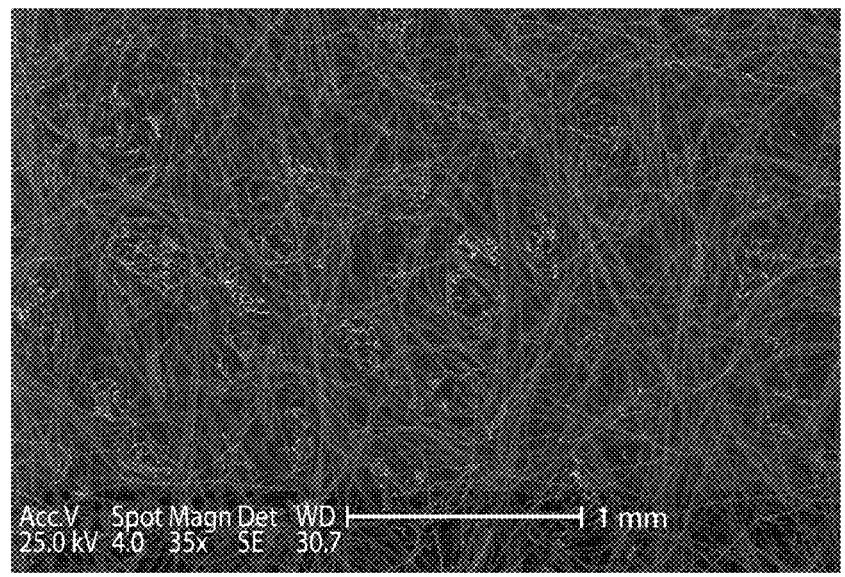
FIG. 4 provides images showing the microstructure of a current collector from a conventional energy storage device.
Figure 4:
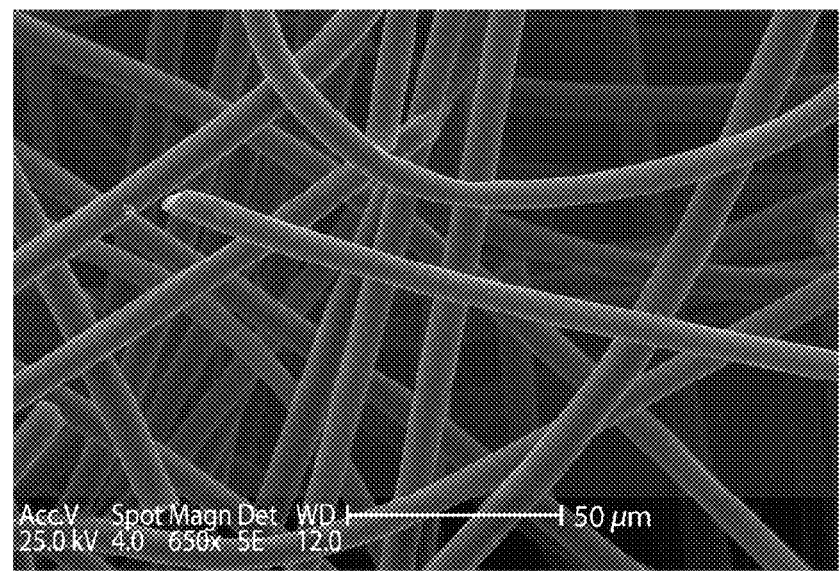
Figure 5:
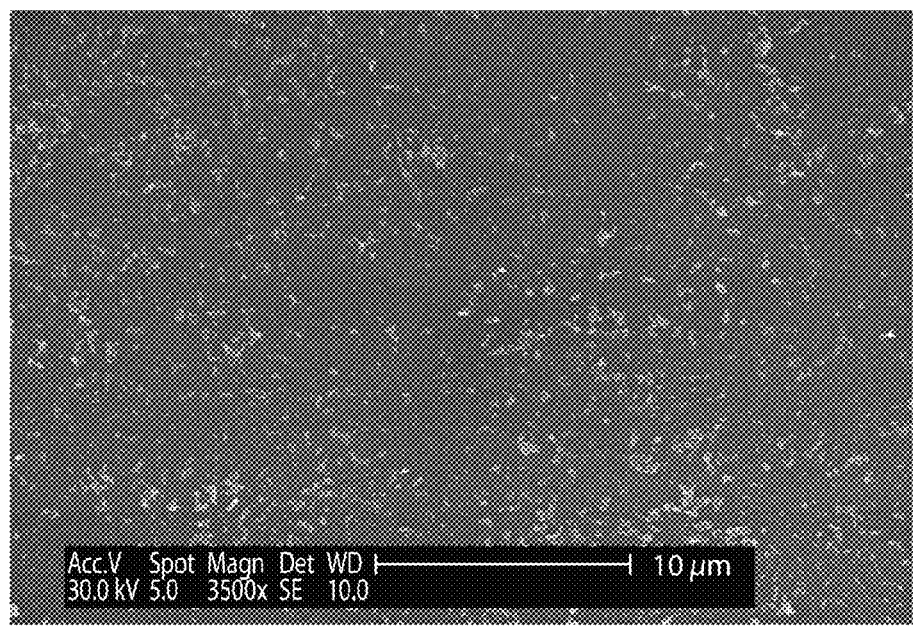
FIG. 5 provides images showing the microstructure of conductive particles in an energy storage device according to some embodiments of the invention.
Figure 5:
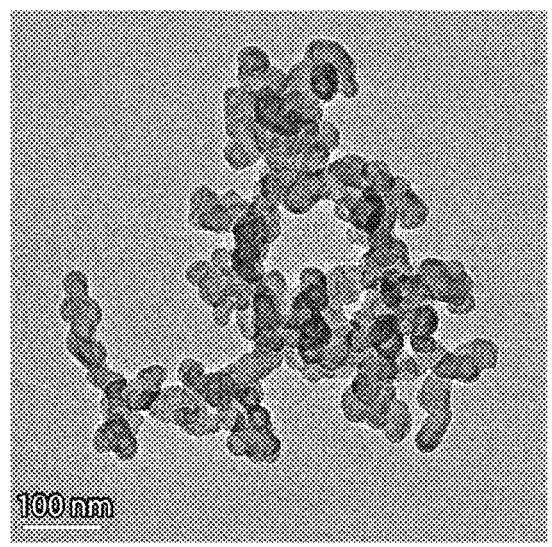

FIG. 4 shows the microstructure of the carbon felt (SGL, a typical current collector for aqueous flow batteries) at low (left) and high (right) magnification. The individual carbon fibers had diameters of about 6 micrometers, giving a geometrically estimated specific surface area of 0.33 $m^2\ g^{-1}$. The felt was comprised of 6 vol % carbon, thus the total carbon surface area per unit volume was approximately $40 \times 10^{-3}\ m^2\ mL^{-1}$. FIG. 5 shows the microstructure of a Ketjenblack suspension at 1.5 vol % loading in a polysulfide solution in TEGDME, viewed in a scanning electron microscope (SEM) using a "wet cell" (left), and a representative primary aggregate in the dry state (right). The Ketjen carbon black had a BET surface area of 1400 $m^2\ g^{-1}$, and for a 1.5 vol % suspension, the carbon surface area per unit volume was 42 $m^2\ mL^{-1}$. Thus the maximum interfacial area available for charge transfer was about 3 orders of magnitude greater for the suspension than for the carbon felt.

The ability to increase electroactive area by $10^3$ while providing sufficient electronic conductivity (discussed below) and retaining flowability benefited electrochemical kinetics in both the solution and precipitation regimes of the Li—S reaction. In the solution regime, where both the suspension and felt were rate-limited by charge-transfer kinetics, the suspension had better rate capability because the required interfacial current density was three orders of magnitude less than that needed for the stationary current collector. On the precipitation plateau, the greater surface area afforded by the suspension allowed an equivalent volume of precipitated $Li_2S_2$ and $Li_2S$ to deposit as a thinner layer, theoretically $10^{-3}$ the thickness, on the nanoscale network than on the carbon felt. The poor reversibility in this regime had been widely attributed to the highly insulating nature of $Li_2S_2$ and $Li_2S$. As shown below, impedance analysis was consistent with markedly reduced charge transfer resistance. In addition, the thinner deposition of precipitate did not inhibit flow in the suspension case, since the current collector and redox solution flowed together. This is especially true as solution concentrations and energy densities increase.

Electrochemical Kinetics for Solution-Phase Polysulfides at Carbon Surfaces

In order to interpret the electrochemical kinetics of both types of devices, the exchange current density at the carbon-solution interface should be determined. These kinetics were measured at "model" carbon surfaces using three-electrode cells, carrying out three types of measurements: 1) steady-state cyclic voltammetry at a carbon fiber microelectrode, 2) galvanostatic polarization at a glassy carbon macroelectrode, and 3) electrochemical impedance spectroscopy with a glassy carbon macroelectrode. For concentrated $Li_2S_8$ solutions in TEGDME, all three methods gave closely agreeing exchange current densities of 0.01-0.02 mA $cm^{-2}$. Table 1 summarizes the exchange current densities measured in $Li_2S_8$ and $Li_2S_6$ solutions by each of these measurement techniques.

TABLE 1

Summary of measured exchange current densities in units of mA $cm^{-2}$

| Composition | Macroelectrode Galvanostatic Polarization | Microelectrode Steady-State Voltammetry | Macroelectrode Impedance Spectroscopy |
|---|---|---|---|
| 2.5M $Li_2S_8$ | 0.011 | 0.011 | 0.022 |
| 2.5M $Li_2S_6$ | 0.017 | Not measured | 0.030 |

Figure 6:
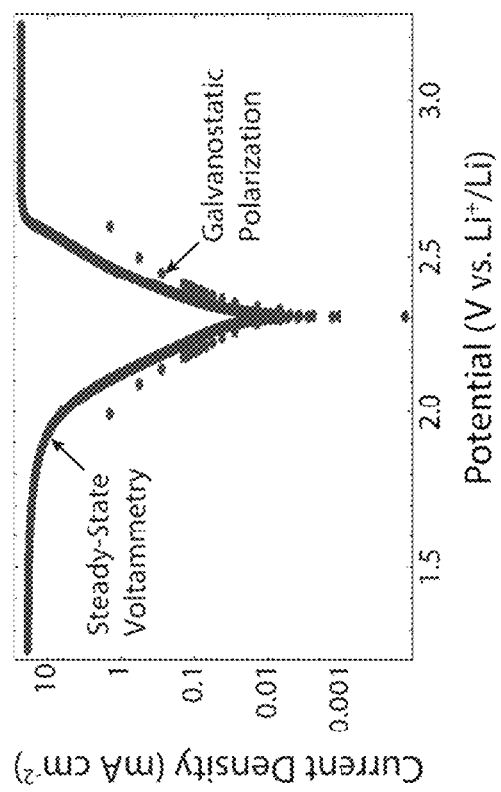
FIG. 6 shows a plot of current density as a function of potential for an energy storage device according to one or more embodiments of the invention.

FIG. 6 shows Tafel plots obtained from galvanostatic polarization and steady-state voltammetry experiments on 2.5 mol S $L^{-1}$ $Li_2S_8$ solutions in TEGDME with 0.5 M LiTFSI supporting electrolyte. The exchange current density was determined by extrapolating the linear portion of the Tafel plot back to the intercept at the equilibrium potential.

Figure 7:
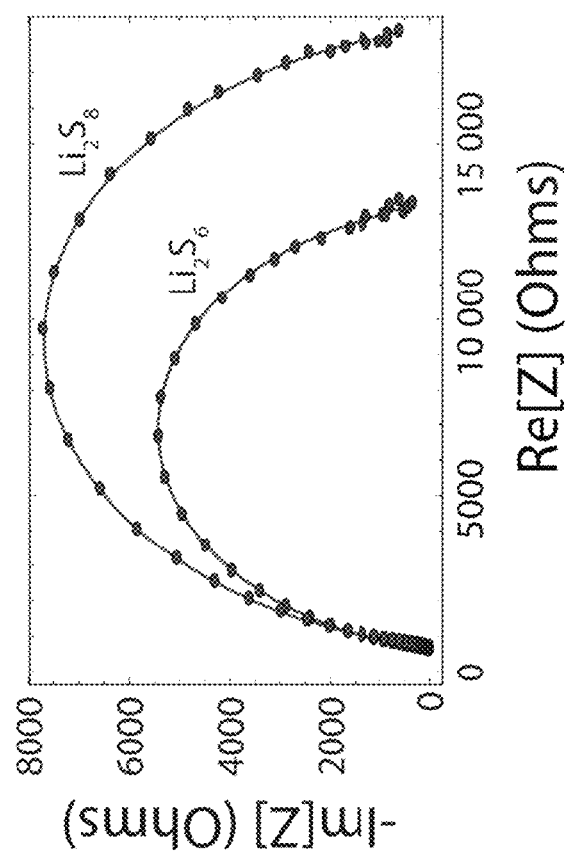
FIG. 7 provides a comparison of impedance for energy storage devices according to some embodiments of the invention.

FIG. 7 shows Nyquist (Cole-Cole) plots of the measured impedance in $Li_2S_8$ and $Li_2S_6$ polysulfide solutions prepared as 2.5 mol S $L^{-1}$ in TEGDME with 0.5 M LiTFSI supporting electrolyte. The solution resistances were nearly identical, while the charge-transfer resistances differed by about 40%.

The exchange current density was estimated from the charge-transfer resistance using the relationship $$R_{ct} = \frac{RT}{nFAi_0}.$$

The impedance measurements were done in three-electrode cells with a 3 mm glassy carbon working electrode and Li metal reference and counter electrodes.

Determining Rate-Limiting Mechanisms from Impedance Spectroscopy

Assuming that the exchange current densities measured above also applied to both the conventional carbon current collector and the "infinite current collector" design, we were able to determine the rate-limiting mechanisms using impedance spectroscopy. Two-electrode Swagelok cells were used, containing the same 2.5 M solution of $Li_2S_8$ in TEGDME with 0.5 M LiTFSI supporting electrolyte, with one case having the 1.5 vol % Ketjen black suspension and the other having the SGL carbon felt filling the cell cavity as a current collector.

TABLE 2

Summary of impedance measurements on Li/polysulfide Swagelok cells with carbon fiber and Ketjenblack suspension cathodes.

| Sample | Solution Resistance (Ohms) | Interfacial Resistance (Ohms) | Charge Transfer Resistance (Ohms) |
|---|---|---|---|
| Suspension | 16 | 79 | 85 |
| Felt | 11 | 79 | 430 |

As shown in Table 2, the solution resistance and interfacial resistance had similar values in the two cells. The difference in total cell impedance lay in the charge transfer resistance, which in this case included impedance contributions from both the finite electronic conductivity of the carbon network (whether felt or suspension) and the Buffer-Volmer kinetics of the electrochemical reaction at the carbon surface. Taking exchange current density to be 0.01 mA cm$^{-2}$ for a 2.5 M $Li_2S_8$ solution as was independently measured, the charge-transfer resistance due to Buffer-Volmer kinetics was expected to be 0.70 Ohms for the suspension and 73 Ohms for the felt. These were much smaller than the charge transfer resistances observed by impedance spectroscopy in both cases (Table 2). Clearly, there were additional contributions to the charge transfer resistance, which we believe to be the electronic resistivity of the carbon current collector. This interpretation was supported by independent measurements of the electronic conductivity of the nanoconductor suspension in a two-electrode cell with blocking (gold) electrodes, i.e., in the absence of electrochemistry. The ~11.5 mS cm$^{-1}$ conductivity measured in this manner was close to the 10.41 mS cm$^{-1}$ conductivity obtained from the charge transfer arc in the electrochemical cell. This indicated that the charge-transfer resistance of the nanoscale suspension was almost entirely due to the electronic conductivity of the network, even though this conductivity was of similar magnitude to the ionic conductivity of the electrolyte (i.e., we had an ideal mixed conductor). This in turn implied that still higher rate capability could be obtained by further increasing the electronic conductivity of the suspension.

When discharging at a C/15 rate from composition $Li_2S_8$ to $Li_2S$, the nanoscale suspension required an average current density at the carbon surface of only $1.7 \times 10^{-5}$ mA cm$^{-2}$, while the carbon felt needed to draw $1.7 \times 10^{-2}$ mA cm$^{-2}$. Again using an exchange current density of 0.01 mA cm$^{-2}$, the suspension and conventional cells required Buffer-Volmer overpotentials of 0.04 and 41.5 mV, respectively. If a conformal $Li_2S$ of uniform thickness is assumed to form on the carbon surface during discharge from $Li_2S_8$ to $Li_2S$, at present polysulfide concentrations the layer thickness for the nanoscale suspension would be 17 nm, while that for the carbon felt current collector would be 17 micrometers.

EXAMPLE 2

A new approach, broadly applicable to flowable redox chemistries—including those which undergo precipitation-dissolution reactions—whereby percolating networks of nanoscale conductor particles are incorporated within fluid electrodes, forming an embedded, self-healing current collector enabling highly distributed electrochemical reactivity throughout the electroactive zone of flow batteries, was demonstrated. In contrast to conventional flow battery designs wherein the electronically-insulating redox fluids undergo charge-transfer reactions only upon contact with the stationary porous current collector (FIG. 8c), the new scheme produced an electronically conductive fluid (i.e., a "liquid wire", FIG. 8d) that acted as its own current collector, providing for charge transfer to the external circuit. The continuous nanoconductor network vastly increased the available charge-transfer area while also reducing the molecular diffusion length between electroactive sites. In the high ionic strength environment of liquid electrolytes, nanoscale carbon conductor particles underwent diffusion-limited aggregation leading to electronic percolation at remarkably low volume concentrations of <1%, and reached 5-20 mS/cm electronic conductivity for only 1-3 vol % solids in non-aqueous electrolytes, providing excellent mixed electronic-ionic conduction with negligible impact on energy density. Lithium-polysulfide (Li-PS) was used as a test system, and the new electrode architecture allowed electrochemical utilization that was increased fivefold over the same solutions used in a conventional flow cell architecture, reaching near-theoretical reversible capacities at practical current rates (e.g., corresponding to 4-15 h duration stationary storage). A lithium-polysulfide flow battery operating in both continuous-flow and intermittent-flow modes was demonstrated for the first time.

Results

Figure 9A:
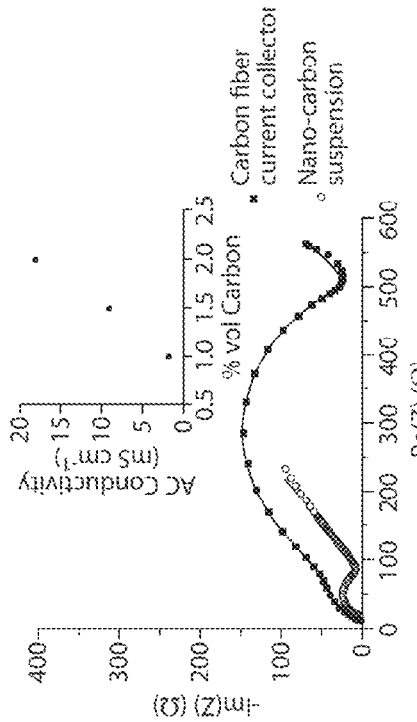
FIG. 9 provides plots of voltage as a function of specific capacity and plots of impedance for a conventional energy storage device and an energy storage device according to one or more embodiments of the invention.

The last few years have seen renewed interest in lithium-sulfur (Li—S) batteries, long considered an attractive energy storage chemistry for its high theoretical energy density (2567 Wh/kg and 2199 Wh/L for elemental Li and S as reactants) and low active materials cost. However, only recently has the adaptation of Li—S chemistry to flow batteries been considered. The high solubility of polysulfides $Li_2S_x$ in nonaqueous electrolytes has historically been detrimental in Li—S batteries as it provides a "shuttle" mechanism for internal self-discharge as well as capacity loss due to incidental $Li_2S$ precipitation within electrochemical cells. It has been suggested that the same attributes could be exploited in flow batteries, with analysis indicating low storage cost ($45/kWh for the raw materials) even when electrochemical cycling is limited to the solution regime between $Li_2S_8$ and $Li_2S_4$ where no precipitation occurs (FIG. 9a). In contrast to the need to minimize polysulfide solubility in a conventional Li—S electrolyte to decrease self-discharge, a high polysulfide solubility is desirable to increase the energy density and reduce the system-level cost of flow batteries. Reversible cycling was demonstrated for 2.5 M to 5 M Li-PS catholyte solutions infiltrated into carbon paper current collectors against self-passivated Li metal negatives electrodes in a non-flowing "membraneless" cell configuration. In the present work, we used similar Li-PS solutions in a half-flow cell against Li metal negative electrodes, the catholyte solutions being composed of $Li_2S_8$ dissolved in tetraethylene glycol dimethyl ether (TEGDME) containing 0.5 M bis(trifluoromethane)sulfonimide lithium salt (LiTFSI) and 1 wt % $LiNO_3$ as the lithium electrode passivation additive. By starting with $Li_2S_8$, the sulfur precipitation regime at high charge voltage (FIG. 9a) was excluded, and the starting flow electrodes had Li-PS purely in solution form. Only a microporous separator film (Tonen Chemical Corporation) separated this catholyte and the Li metal negative electrode. The theoretical specific capacity of the solution upon discharging $Li_2S_8$ to the $Li_2S_4$ liquid solution limit was 210 mAh/g, while that for discharging to $Li_2S$ precipitation was 1460 mAh/g (FIG. 9a); at 2.5 mol S/L concentration, as used in our flow experiments, the catholyte energy density (vs.) $Li^+/Li°$) was 34 Wh/L and 234 Wh/L for discharge to the solution and precipitation limits, respectively. Clearly, it was desirable to utilize storage capacity in the precipitation regime. (Herein, all specific capacities given in mAh/g refer to capacity per gram of sulfur.)

To implement the nanoconductor suspension approach, several nanoscale carbons including carbon blacks and single- and multi-wall carbon nanotubes (SWNTs and MWNTs) were dispersed in the Li-PS solution, and their conductivities and rheological properties measured, following methodologies developed in previous work on semi-solid flow batteries[5,18]. For our purposes, the ideal nanoscale conductor provides the highest electronic conductivity at the lowest volume fraction and with the lowest yield stress and viscosity. Amongst the nano-carbons tested, one particular carbon black (Ketjenblack EC-600JD, AzkoNobel, hereafter referred to as KB) met these criteria best. KB is a 1400 $m^2$/g nanoscale carbon with ~30 nm primary particle size (TEM images in FIG. 8). Surprisingly, electrical percolation producing 2 mS/cm electronic conductivity was observed at as low as 1 vol % KB, increasing to 9 mS/cm by 1.5 vol % carbon and 18 mS/cm by 2 vol % KB (inset of FIG. 9b). Since the room temperature ionic conductivity of the Li-PS solution was 1.5 mS/cm, the suspensions had the unusual characteristic of being mixed electronic-ionic conductors in fluid form. Jamming behavior in suspensions of small particles has been studied theoretically and experimentally; for instance small amplitude oscillatory shear rheometry detects mechanical percolation of micron-scale carbon particles in nonaqueous media at volume concentrations of ~5 vol %. This is already much lower than the ~30 vol % percolation threshold for non-interacting like-sized spheres in three-dimensions, and has been attributed to diffusion limited aggregation (DLA) of strongly attracting particles into fractal networks (i.e., "hit and stick" behavior). The still-lower electrical percolation threshold observed here was attributed to the combination of nanoscale particle size and high ionic strength (true of any liquid electrolyte), which will further strengthen the attractive DLA interactions by quenching Debye-Huckel electrostatic double-layers that could produce interparticle repulsion. Limited tests of solutions with and without LiTFSI showed a factor of two higher dc conductivity when salt is used. Two-dimensional sections observed in wet-cell SEM (FIG. 8b) were consistent with a low-density three-dimensional solids network. Viscometry showed that the 2.5 mol S/L solution had Newtonian rheology with 15 mPa s viscosity, whereas the nanoparticle suspension based on the same solvent with 1.5 vol % KB had Bingham plastic rheology with 64.6 Pa yield stress and 710 mPa-s plastic viscosity. The nanoparticle suspension had a rheological response at room temperature that was qualitatively similar to ketchup, and it was readily pumped in the flow battery experiments described later.

Electrode Tests in Non-Flowing Cells.

Figure 8C:
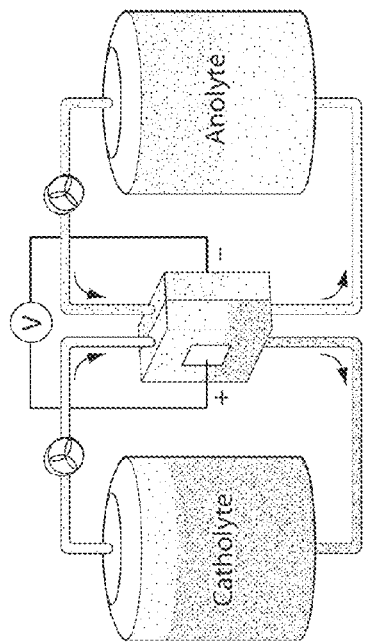
Figure 9B:
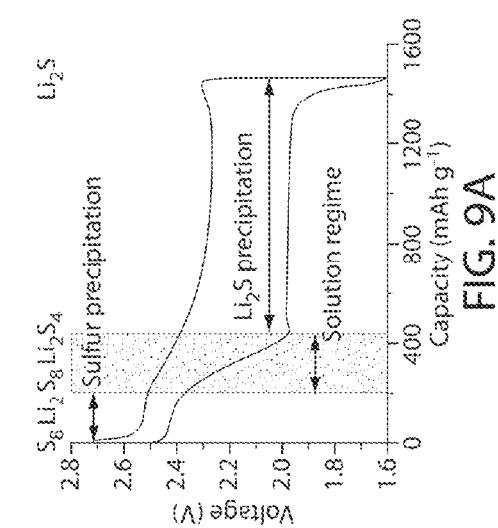
Figure 9C:
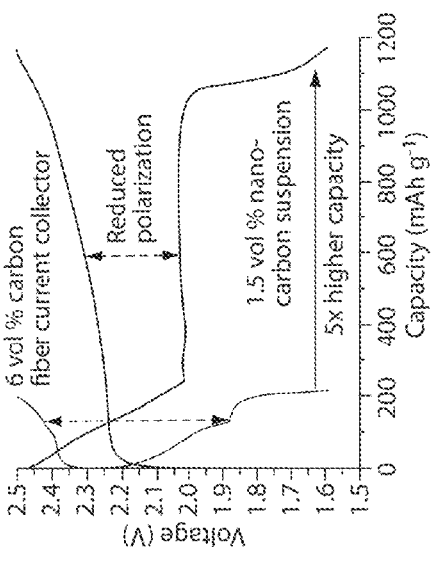
Figure 9D:
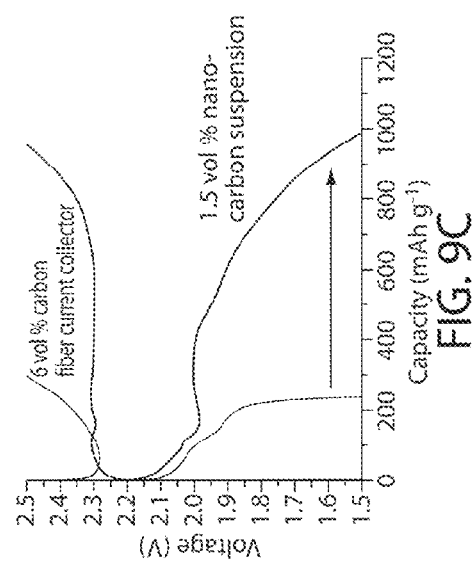
Figure 10:
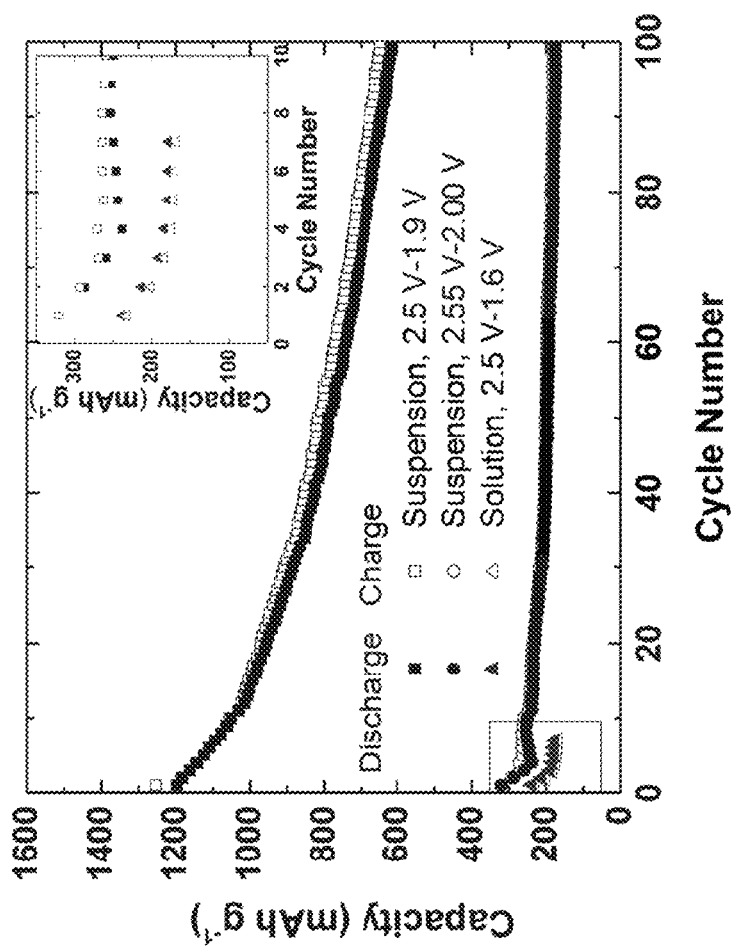
FIG. 10 provides a plot of specific capacity as a function of cycle number for various embodiments of the invention.

Electrochemical testing in half-cells of membraneless configuration (i.e., using only the separator film to prevent electrical contact of the two electrodes) showed that the in situ nanoparticle conductor network markedly enhanced the electrochemical utilization of the polysulfide solution. FIGS. 9c and 9d show direct comparisons of the same 2.5 mol S/L polysulfide solution in non-flowing half-cells with a carbon fiber current collector, and with a carbon nanoparticle suspension. The carbon fiber current collector used here and in the flow cells was a low-flow-resistance non-woven "felt" (SGL GFD3, FIG. 8c) widely used in aqueous flow batteries. For 3.0 mm-thick electrodes tested at C/50 galvanostatic rate, the capacity of the nanoparticle suspension was a factor of 4 greater than that of the conventional configuration, reaching 1000 mAh/g specific capacity. For thinner 0.5 mm electrodes tested at a higher C/4 rate, the capacity of the suspension electrode reached 1200 mAh/g (vs. 1460 mAh/g theoretical capacity), about a factor of 5 greater than with the fiber current collector. Note that the discharge curve for the Li—S system has three distinct regions (FIG. 9a). There is a high voltage plateau (~2.5 V) through which solid sulfur coexists with soluble lithium polysulfides. This is followed by a solution regime with sloping voltage (2.5-2.1 V) over which sulfur is fully dissolved as soluble polysulfides, then a lower voltage plateau (~2.0 V) where the discharge reaction proceeds via precipitation of the insoluble $Li_2S$. FIGS. 9c and 9d (showing the second cycle in all cases) show that the conventional cell architecture delivered capacity that was primarily in the solution regime. In contrast, the nanoscale suspension had both higher capacity and significantly improved reversibility when cells were cycled to include the precipitation regime. This electrode format provided correspondingly higher capacity and energy density in the same cell. It is also possible to limit cycling to the solution regime. As shown in FIG. 10, cycling of the nanoparticle suspension over the 2.55 V-2.00 V solution regime gave 34% higher initial capacity than the same solution used with the carbon fiber current collector. For the suspension cycled over the solution regime, stable cycling with 56% capacity retention after 100 cycles and 50% retention after 500 cycles was seen. Cycling over the 1.90-2.50 V range to include capacity enhancement from $Li_2S$ precipitation gave fourfold higher initial capacity of 1200 mAh/g (FIG. 10). The fade rate was also greater, yielding 610 mAh/g after 100 cycles, or about 50% retention, but this level of capacity retention was in fact superior to many published results for Li—S batteries using solid sulfur cathodes. The coulombic efficiency exceeded 95% for cycling within both the solution and precipitation regimes.

Reaction Kinetics and Contributions to Impedance.

Contributions to impedance, and the origin of the highly facile reaction in the suspension electrodes, were deconvolved using electrochemical impedance spectroscopy (EIS). The Nyquist plot in FIG. 9b shows the large difference in cell impedance for the two approaches, which was systematically investigated as follows. We first measured the exchange current density at the interface between carbon and the present Li-PS solutions, using carbon fiber microelectrodes and glassy carbon macroelectrodes as model current collectors. Three types of measurements, each with three-electrode cells, were conducted: 1) steady-state cyclic voltammetry at a carbon fiber microelectrode, 2) galvanostatic polarization at a glassy carbon macroelectrode, and 3) electrochemical impedance spectroscopy using a glassy carbon macroelectrode. For the present $Li_2S_8$-TEGDME solutions, the three methods gave exchange current densities in the range 0.011-0.030 mA $cm^{-2}$. Measurements of otherwise identical $Li_2S_6$ solutions (i.e., chemically prepared in a partially discharged state) showed ~40% higher exchange current densities, while the solution conductivity was essentially unchanged. This shows that as Li—S cells are discharged within the solution regime, the exchange current density increases. To our knowledge these were the first exchange current density measurements for lithium-polysulfides on carbon electrodes.

Next, the EIS results in FIG. 9b were separated into three major impedance contributions with the help of independent measurements, using impedance spectroscopy in the absence of electrochemistry with ion-blocking (gold) electrodes, of the ionic conductivity of the Li-PS solution and the electronic conductivity of the nanoscale suspensions (inset in FIG. 9b). As shown in Table 1, the solution resistance (obtained from the high frequency intercept with the Z' axis) and interfacial resistance (the left-most arc) had similar values in the two types of cells, as expected. The difference in cell impedance was dominated by the charge transfer resistance (right-most arc), which in this case included impedance from the finite electronic conductivity of the carbon network (whether fiber or suspension), as well as the exchange current density (Buffer-Volmer kinetics) at the carbon surface. Based on the exchange current density of ~0.01 mA $cm^{-2}$, the actual current densities and overpotentials can be estimated as follows. The theoretically available carbon-electrolyte interfacial area of the carbon fiber current collector (FIG. 8c) was ~0.33 $m^2g^{-1}$ based on the ~6 μm fiber diameter. The fiber current collector occupied 6 vol % of the cell, giving a collector surface area per cell volume of ~40×$10^{-3}$ $m^2$ $mL^{-1}$. FIG. 8c shows the microstructure of the 1.5 vol % KB suspension, viewed in an SEM using a "wet cell" with an electron-transparent window, and a representative primary aggregate in the dry state. The carbon nanoparticles comprised a BET area of ~1400 $m^2$ $g^{-1}$, which at 1.5 vol % provided carbon area per unit volume of ~42 $m^2$ $mL^{-1}$. Thus the available interfacial area for charge transfer was more than $10^3$ greater for the suspension than for the carbon fiber collector, even though there was only one-fourth as much carbon. Assuming all of the carbon-electrolyte interfacial area to be active, and taking the exchange current density to be 0.01 mA $cm^{-2}$ as independently measured, discharging at a C/15 rate from composition $Li_2S_8$ to $Li_2S$ corresponds to an average current density at the carbon surface of only 1.7×$10^{-5}$ mA $cm^{-2}$ for the nanoscale suspension, while the carbon fiber collector will need to draw 1.7×$10^{-2}$ mA $cm^{-2}$. The corresponding Buffer-Volmer overpotentials were 0.04 and 41.5 mV, respectively.

Further analysis of the charge transfer resistance for the nanoscale suspension suggests that at such low exchange current densities, the surface reaction kinetics may not be rate-limiting at all. If Buffer-Volmer kinetics were limiting, the charge transfer resistance was computed to be 0.22 Ohm $cm^2$ for the suspension, which is much lower than the 3.8 Ohm $cm^2$ observed in EIS (Table 1), suggesting that the charge-transfer resistance of the nanoscale suspension is dominated by the electronic conductivity of the network. The electronic conductivity of the nanoscale suspension is ~10 mS $cm^{-1}$ conductivity for the 1.5 vol % KB suspension (FIG. 9b), within a factor of two of that computed from the EIS charge transfer resistance assuming electronic conductivity to be the only contribution. This in turn implies that further improvements in the electronic conductivity of the nanoscale conductor suspensions could yield higher rate capability. Improvements in solution-phase ionic conductivity may also be expected to yield enhanced rate capability.

Within the precipitation regime, the poor reversibility of conventional Li—S batteries has been widely attributed to the highly insulating nature of $Li_2S$. Here, we note that if a conformal $Li_2S$ layer of uniform thickness is assumed to form on the carbon surface during full discharge from $Li_2S_8$ to $Li_2S$, at 2.5 mole S/L concentration the layer thickness (based on a molar volume of 2.768×$10^{-2}$ L/mol for $Li_2S$) is 1.7 nm for the nanoscale suspension, compared to 1.7 μm for the carbon felt current collector. Thus the superior capacity and reversibility of the nanoscale suspension can be attributed to a combination of two effects: ultra-low current densities at the catholyte-carbon interface, and a much finer-scale precipitation of $Li_2S$. Topologically, the embedded, self-healing current collector is in some ways the inverse of the mesoporous carbon hosts for sulfur that have shown promise in conventional Li—S batteries. The current conductive, flowable electrode approach may have benefits for non-flowing metal-sulfide batteries as well, as illustrated by the cell results in FIGS. 9c and 9d.

Flow Cell Tests.

Tests performed in a lab-scale half-flow cell (FIG. 8b) showed that the vastly improved charge transfer kinetics of the nanoscale suspensions were retained under two types of flowing conditions: 1) continuous flow, which is the typical operating mode of solution-based flow batteries; and 2) intermittent flow, where fluid is pumped in discrete volumes with complete charging or discharging of the electroactive region occurring in between. Intermittent flow has been shown to produce higher round-trip energy efficiency for significantly non-Newtonian redox fluids.

Figure 8A:
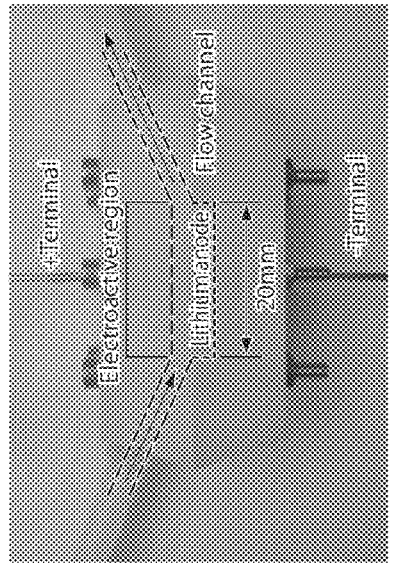
FIG. 8 provides illustrations of a conventional energy storage device and an energy storage device according to one or more embodiments of the invention.
Figure 8B:
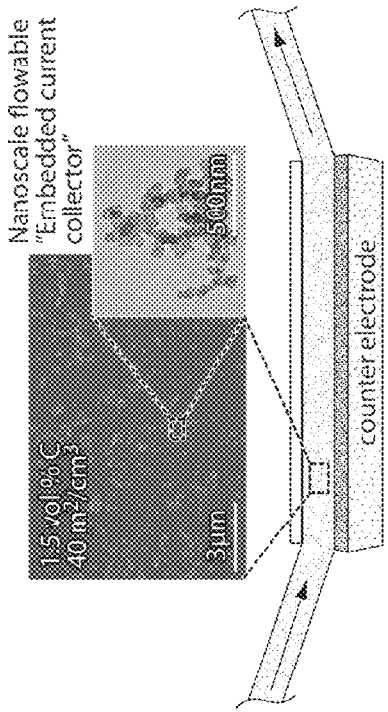
Figure 8D:
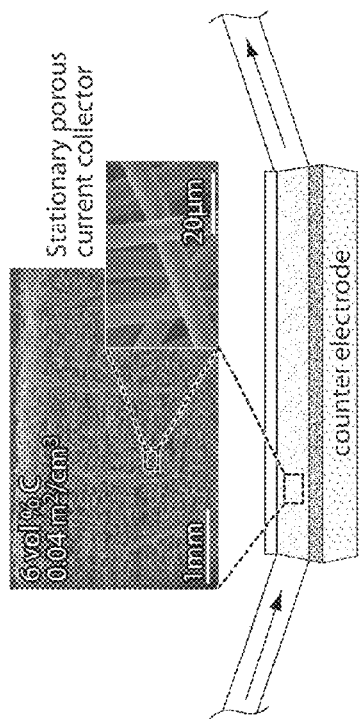

To demonstrate cycling under continuous flow, automated digitally-controlled syringe pumps were used with the cell in FIG. 8b. The ratio of cell volume to pumped volume was 1:4, and the total volume (80 microliters) passed through the cell in 100 min. (i.e., for a flow battery with a single cathode tank, the entire tank volume circulated once every 100 min.). Results for the nanoscale suspensions appear in FIG. 11. During the first 1.5 cycles, the cell was discharged and charged potentiostatically between 2.1 V and 2.5 V (FIG. 11) to stay in the solution regime. Since the Li-PS battery was assembled in the charged state, the first half-cycle discharged the cell, whereas the relevant coulombic and energy efficiency for a storage battery was that occurring upon charging and discharging. Efficiencies were therefore only reported for subsequent cycles where there was a full charge/discharge sequence. During the potentiostatic charge/discharge cycle in the solution regime, the discharge capacity was 181 mAh/g, the coulombic efficiency was 101% (the higher-than-theoretical value is due to diffusive exchange of charged cathode at the edges of the electroactive zone), and the round-trip energy efficiency was 84.7%. Operating in this regime, the energy density of the flow cathode alone was 30.4 Wh/L (specific energy 380 Wh/kg). To evaluate the energy density of the electrochemical couple, a reasonable excess of Li metal must be assumed. Herein we will assume 100% excess of Li relative to the actual capacity of the cell, in which case the active-materials-only energy density in the solution regime is 26.7 Wh/L (specific energy 334 Wh/kg).

Figure 11:
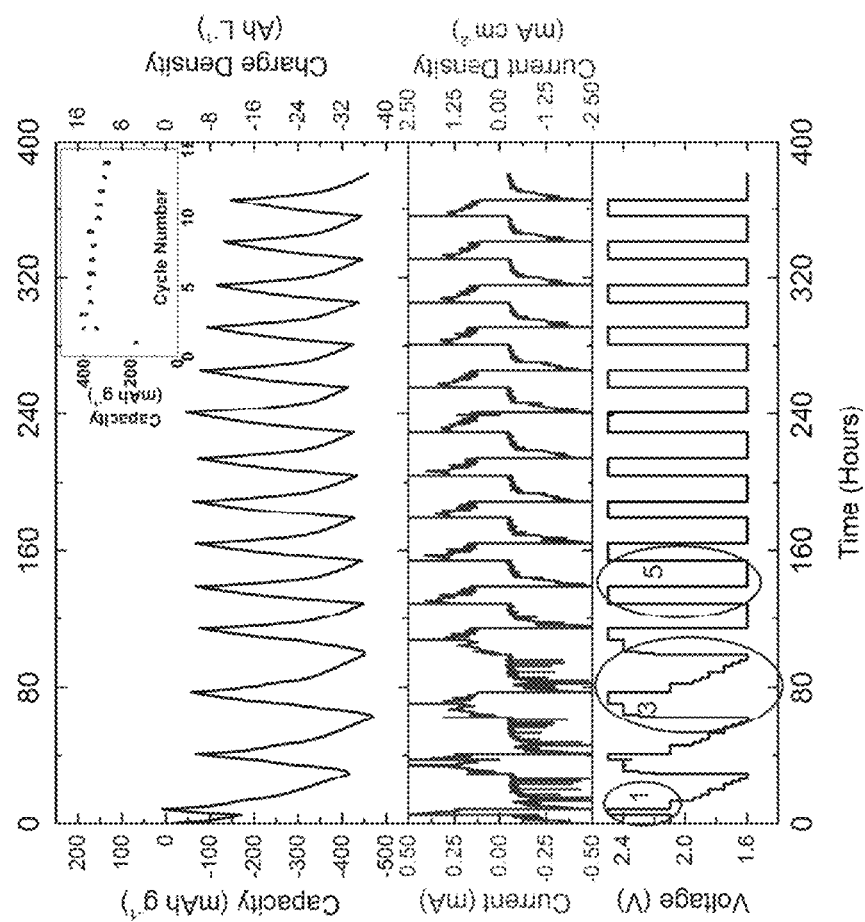
FIG. 11 provides plots of voltage, current, and specific capacity as a function of time for an energy storage device under continuous flow, in accordance with some embodiments of the invention.

A stepped potentiostatic protocol was then applied between voltage limits of 2.5 V-1.6 V, as shown for the intermediate cycles in FIG. 11. This cycled the flow cathode into the precipitation regime, more than doubling the capacity compared to the solution regime. The step sequence was selected to provide approximately constant overpotential relative to the equilibrium cell voltage; more sophisticated feedback-based control algorithms that control overpotential were possible. For the third complete charge/discharge cycle, the discharge capacity was 393 mAh/g, and coulombic and energetic efficiencies were 95.6% and 75.7%, respectively. Under this potentiostatic protocol, the net cycling rate for the entire system was C/15 on charge and C/22 on discharge. The cathode discharge energy density was 61 Wh/L (760 Wh/kg), and the cathode plus lithium energy density was 46.7 Wh/L (584 Wh/kg). Finally, the cell was cycled potentiostatically between the same voltage limits, but without intermediate potential steps. This increased the system-level C-rate to C/10 for charge and C/15 for discharge, and correspondingly, the capacity was slightly lower at 376 mAh/g in cycle 5, and energy efficiency decreased to 63%. The reduced energy efficiency was to be expected for this potentiostatic protocol due to the high overpotential relative to equilibrium cell voltage that was applied across most of the state of charge range. The active-materials-only discharge energy density was 44.1-48.1 Wh/L (552-602 Wh/kg). During cycles 5-14, despite some capacity fade as shown in the inset in FIG. 11, the coulombic efficiency remained above 99.5%. This suggests that impedance growth rather than loss of storage capacity in the flow cathode was responsible for the capacity fade. It would not be surprising for impedance growth to take place at the stationary Li metal negative electrode, given the large areal capacity that was reversibly plated throughout this experiment. Upon increasing charge time by ~10% in cycle 15 (not shown), we found that the discharge capacity was restored, consistent with an impedance limitation.

Intermittent flow cycling was then demonstrated using the same cell geometry and nanocarbon suspension, with results appearing in FIG. 12. A total of five cell volumes was flowed through the cell during a complete charge-discharge cycle, with each flow pulse having a volume that was one-half the cell volume (i.e., ten intermittent pumping pulses were used during each discharge and charge). Fluid-mechanical analysis suggested that the velocity profile in the flow cell was highly non-uniform, based on the suspension's rheology, pulse flow rate (30 µL/s), and channel design. Accordingly, the volume of intermittent flow pulses was chosen to minimize the coulombic and energetic inefficiencies that were induced by flow non-uniformity. After each pumping step, the cell was galvanostatically discharged or charged, testing the solution and precipitation regimes with voltage limits of 2.55 V-1.95 V and 2.8 V-1.6 V, respectively. The capacity axis in FIG. 12 gives the specific capacity with respect to all sulfur in the system, assuming a uniform state-of-charge.

Figure 12A:
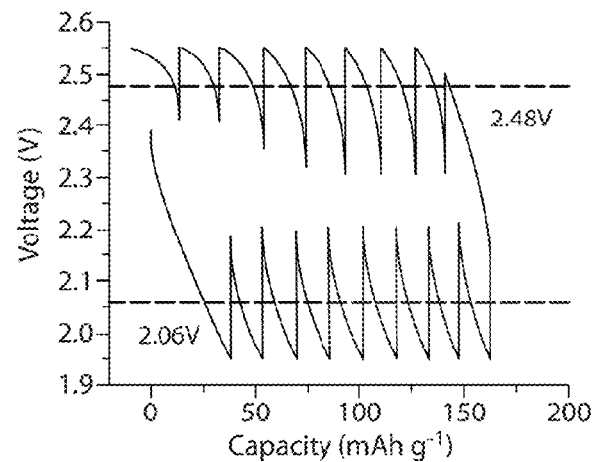
FIG. 12 provides plots of voltage as a function of specific capacity for an energy storage device under intermittent flow, in accordance with certain embodiments of the invention.
Figure 12B:
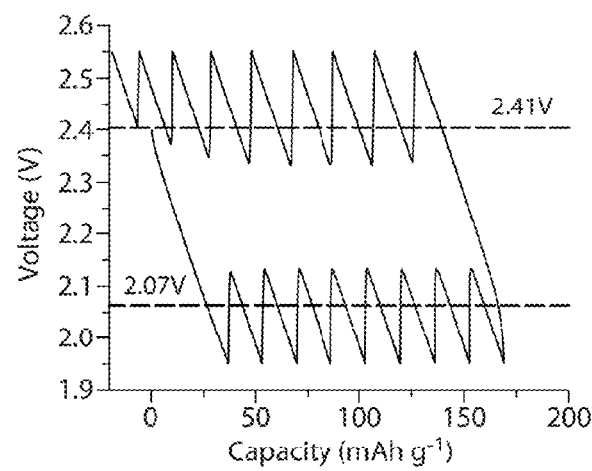
Figure 12C:
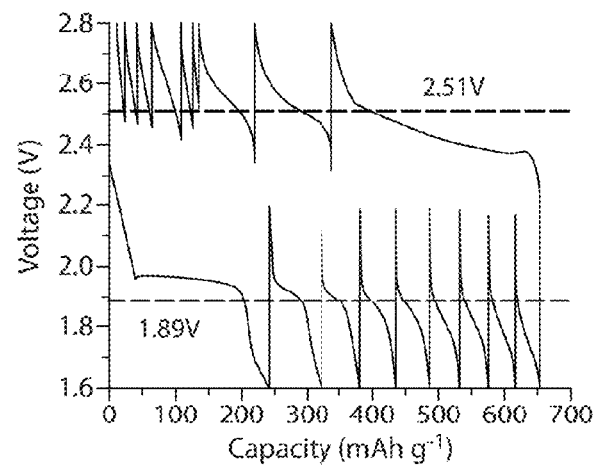

FIG. 12a shows the discharge-charge curve for the solution-only case, where the discharge and charge capacities were 162 mAh/g and 172 mAh/g, respectively, and the total discharge rate for the tank was C/5. The voltage-efficiency under these conditions (84% at C/5) exceeded that of potentiostatic, continuous-flow cycling at lower effective rate (78% at ~C/10). This performance demonstrated the ability of the intermittent flow mode to cycle more efficiently than continuous flow. The simulated charge-discharge curve under these conditions is shown in FIG. 12b. The discharge voltage trends of the experiment and simulation agreed well. An instantaneous jump in discharge voltage occurred after each intermittent flow pulse, because fresh suspension, rich in $Li_2S_8$, flowed into the cell's electroactive region. The value of the voltage after the pulse (2.1-2.2 V) was substantially less than the open-circuit potential of the $Li_2S_8$ suspension (2.42 V). Voltage was reduced below this value because the electroactive region was incompletely replenished by the flow pulse. As a result, the solution phase of the suspension was more highly charged near the cell's inlet (nominally, $Li_2S_8$) than near the outlet (nominally, $Li_2S_4$). The average discharge voltage of the experiment (2.06 V) was in excellent agreement with the simulation (2.07 V), suggesting that Li-PSs were locally in equilibrium during discharge, as assumed in the model. The experimental charge-voltage trends differed markedly from the idealized model, though, with a 70 mV deviation on average. While the simulation predicted linear variation of voltage with time after an intermittent pulse, the experiment exhibited sigmoidal variation of voltage. Recent in operando analyses of speciation in Li—S systems suggested that charge and discharge processes in the Li—S system proceed through different reaction pathways. The present deviation of experimental charge voltage from the simulation was consistent with these observations.

When the voltage window was widened to include precipitation, the discharge capacity increased about four-fold to 653 mAh/g (FIG. 12c), with the discharge rate decreasing to C/18. These initial results demonstrated what we believe to be a higher efficiency alternative to continuous flow mode operation that reduces pumping losses, especially for higher energy density redox electrodes with substantial yield stresses and strongly shear-thinning rheology.

Thus we showed that by using nanoscale conductor suspensions to form flowable electrically percolating networks, the electrochemical reactivity of solution-based redox electrodes could be greatly enhanced compared to that obtained with a conventional carbon fiber current collector. In addition, this novel flow electrode architecture allows redox solutions to be reversibly cycled into composition regimes where solid precipitation occurs. The nanoscale suspensions retain their electronic conductivity and enhanced reactivity under flow, and can be regarded as "self-healing." They may be used in flow cells that operate in continuous or intermittent flow modes. Just 1.5 vol % added nanoscale carbon allows Li-PS flow electrodes to operate in the precipitation regime where the specific energy and energy density increase by up to a factor of 5 compared to that obtained using only the solution regime. One of the great attractions of the Li—S system is the very low cost of the elemental reactants on an energy basis. For a reversible capacity of 600 mAh/g and average discharge voltage of 1.9V representing the present 2.5 mol S/L system, the raw materials cost of the flow cathode was $21/kWh, and that of the electrochemical couple (assuming 100% excess of Li metal) was only $37/kWh, leaving ample room for other component cost while meeting the $100/kWh target. We believe that with further development, higher capacity utilization in higher molarity solutions is achievable, which would further drive down the cost of storage. The nanoconductor suspension architecture can clearly also be used for anolytes, allowing a full flow battery as well as the half-flow system demonstrated here.

Methods:
Preparation of Flow Electrodes

To prepare the lithium polysulfide solution, $Li_2S$, sulfur, LiTFSI, and $LiNO_3$ were dried under vacuum for 24 h at 100° C. and added to TEGDME and stirred for 24 h in an Ar-filled glovebox, at 60° C. To prepare the suspension, carbon black (Ketjenblack EC-600JD, AzkoNobel) was added to the aforementioned solution, manually stirred, and then sonicated for 30 minutes. LiTFSI and LiNO$_3$ were obtained from Sigma-Aldrich, while the sulfur, Li$_2$S, and TEGDME were obtained from Alfa Aesar.

Microscopy Characterization

Scanning electron microscopy of the carbon felt was carried out using a FEI/Philips XL30 environmental SEM with secondary electron detector operating at 25 kV accelerating voltage. Suspensions were imaged in QuantomiX WETSEM® QX-102 capsules using the FEI/Philips XL30 with a backscattered electron detector and accelerating voltages of 20-30 kV. The dry Ketjenblack powder was imaged on a JEOL 2010F transmission electron microscope with an accelerating voltage of 200 kV. Samples were prepared by dispersing the carbon black on a Cu grid coated with an amorphous carbon film.

Exchange Current Density Measurements

In the galvanostatic polarization experiment, the polysulfide solution was vigorously stirred to ensure no mass-transport limitation, while a specified current was drawn from the cell using a 3 mm glassy carbon working electrode (CH Instruments, Inc.) for 30 minutes. The corresponding potential was determined as the average potential during the 30 minute galvanostatic step. In the steady-state voltammetry experiments, an 11 μm carbon-fiber microelectrode (BASi, Inc) was used as a working electrode and the potential was swept cathodically at 20 mV/s from 3.24 V vs. Li$^+$/Li to 1.24 V.

Cycling Experiments in Non-Flowing Half-Cells

Swagelok® type cells with 0.5 mm deep wells were used. A Tonen separator soaked with electrolyte was used. All cell assembly was performed inside an argon-filled glovebox.

Flow Cell Experiments

The lab-scale flow cell used for intermittent and continuous flow experiments was machined from polyvinylidene fluoride (PVDF), with an electroactive region machined from nickel and sputter-coated with gold. The electroactive region was 20 mm long, with square cross sections ranging from 1 mm to 2.8 mm width. For a 1 mm channel, the channel volume was 20 microliters, with an active membrane area of 0.2 cm$^2$. The cell was connected with polytetrafluoroethylene (PTFE) tubing to gastight glass syringes (Hamilton Model 1005), which were driven using syringe pumps (neMESYS, Cetoni GmbH). Electrochemical testing was performed using a Bio-Logic potentiostat.

EIS and IS Measurements

Electrochemical impedance measurements were made in Swagelok-type cells (Swagelok Co.) with a PTFE body, cathode well 6.35 mm in diameter and 2.8 mm deep, and with Li metal as a counter and reference electrode. The measurements were taken with Li$_2$S$_8$ solutions, 2.5 mol S L$^{-1}$ in TEGDME with 0.5 M LiTFSI supporting electrolyte. The suspension had 1.5 vol % Ketjenblack. The well was Au coated Ni. When characterizing the solution electrode, 3 mm thick carbon felt was cut to fit the cathode well and compressed to 2.8 mm thickness upon assembly. When measuring the suspension electrodes, the suspensions were spatula-loaded into the well and covered with a circular piece of separator film. A circular film of lithium metal, attached to a stainless steel current collector, was applied against the well by light spring force. IS electronic and ionic conductivity measurements were made in a similar two-electrode cells using gold-sputtered current collectors on both sides. Measurements were taken over the course of one to two hours.

The EIS measurements used the Solartron 1400 system with a Solartron 1455 frequency response analyzer. The experiments were performed with cells in the fully charged (as-assembled) state. Sinusoidal voltage oscillations of 10 mV amplitude were applied about the cell's open circuit voltage between the two electrodes. Oscillation frequencies were swept logarithmically from 0.01 Hz to 1 MHz. The measured impedance data were fit to an equivalent circuit by a complex nonlinear least squares regression. For the IS measurements, a Solartron Analytical model 1470 potentiostat and model 1455 frequency response analyzer were used to apply either a +/−50 mV AC or DC bias. The DC measurements were taken at a steady state value after a 15 minute hold. Resistances were converted to conductivities by dividing by the experimental cell factor, calibrated to be 1.2 cm$^{-1}$ using a 15 mS/cm conductivity standard produced by Oakton Instruments.

Rheological Characterization

The viscometric behavior of the different solutions and semi-solid suspensions was measured using a Malvern Kinexus Pro torsional rheometer enclosed in a glovebox with an Argon atmosphere (H$_2$O & O$_2$ levels <0.1 ppm). Steady shear viscometry tests, as well as, small amplitude oscillatory frequency sweeps, were performed using a smooth parallel plate geometry (D=40 mm; mean roughness R$_q$=0.36 micrometers). All tests were performed at T=25° C., and the temperature was regulated with a Peltier plate system. Steady shear tests were performed with decreasing applied shear rates to insure the existence of a simple yield stress for the material and avoid possible transient shear banding. In addition, the same sample was tested at three different gaps (H=1 mm, 0.75 mm, 0.5 mm respectively) to probe and correct for slip effects. If the flow curves at different gaps superimpose, the material does not slip. If gap-dependent rheology is observed, a correction needs to be applied to extract the true shear rate applied on the sample at each value of the applied stress.

TABLE 1

Comparison of impedance contributions for non-flowing Li/polysulfide cells using the same Li-PS solution with a nanoscale conductor suspension and with a conventional carbon fiber current collector.

| Sample | Solution Resistance (Ohm cm$^2$) | Interfacial Resistance (Ohm cm$^2$) | Charge Transfer Resistance (Ohm cm$^2$) |
|---|---|---|---|
| Nanoconductor Suspension | 5.1 | 16 | 3.8 |
| Carbon Fiber Current Collector | 3.5 | 31 | 125 |

EXAMPLE 3

High Energy Density Semi-Solid Electrodes and Batteries Thereof

The energy density of storage electrodes and of batteries using such electrodes were increased by combining redox active solution electrodes with redox active solid electrodes, forming suspensions of the latter in the former. In contrast to conventional battery types such as the lithium ion battery, wherein solid storage particles such as intercalation compounds are used with a liquid electrolyte that provides for ion transport but negligible storage, having typically only about 1 M Li salt concentration in the electrolyte, or batteries using solution electrodes such as aqueous redox flow batteries, here the energy density of electrodes was increased by using solid electrode materials suspended in a redox-active solution electrode, forming a semi-solid. Such electrodes were used in flow batteries, wherein the semi-solid electrode was flowed through a stack in which the electrochemical reaction took place, and in non-flowing battery designs, where the semi-solid was substantially stationary during use.

In some embodiments, the electrochemical activity of the semi-solid electrode was improved by rendering it electronically conductive. Electronic conductivity was provided to the semi-solid electrode by incorporating within a percolating network of electronically conductive species. Such species may have been the storage particles themselves, and/or additive materials that were electronically conductive. In some embodiments an electronically conductive network was obtained by co-suspending carbon conductive additives with the storage materials particles. In another embodiment, electronic conductivity was obtained by carbon coating the redox active solid particles, which then formed a percolating network in the semi-solid.

In some embodiments, the solution electrode was a solution of metal polysulfides, such as polysulfides of lithium, magnesium, zinc, or other metals. In some embodiments the suspended solid particles comprised sulfur, or were composites of sulfur and an electronically conductive solid. Said electronically conductive solids may have included but were not limited to carbon, a metal, metal nitride, metal carbide, or metal oxide.

Lithium Metal/Polysulfide Electrolyte/Sulfur-Carbon (S—C) Composite Cell

The cathode comprised a suspension of high performance S—C composite (e.g., made by infiltrating molten sulfur into a mesoporous carbon) and a conductive additive such as carbon particulates, the solids being suspended in a polysulfide redox-active solution. The polysulfide solution was made by adding $Li_2S$ and S at a molar ratio of 1:7 into a mixture of dioxolane (DOL) and dimethoxyethane (DME) at 1:1 ratio by volume. The mixture was stirred at 50° C., then optionally 0.5 M lithium bis(Trifluoromethanesulfonyl)imide (LITFSI) was added to increase ionic conductivity. This semi-solid served as a high energy density electrode in a battery.

In some embodiments, the anode of the battery was lithium metal, which was pretreated by soaking in 0.5 M LITFSI in DOL/DME solution with 1 wt % $LiNO_3$ added. In some embodiments, the semi-solid cathode was non-flowing. In other embodiments, the semi-solid cathode was a flow electrode in a flow battery. Such a flow battery may have been a half-flow cell in which the anode was a stationary electrode, including but not limited to lithium metal, or a full flow cell, in which the anode was also a flow electrode of solution or semi-solid type.

The energy densities of cathode/Li metal couples according to Example 1 are summarized in Table 1. The capacity for Sulfur was assumed to be 1664 mAh/g,k or 3327 mAh/cc. The energy density of theoretical Li—Sulfur cell was 2550 Wh/kg, or 2792 Wh/L, assuming the capacity of Li was 3842 mAh/g, or 2502 mAh/cc. 2 vol % carbon conductive additive with a density of 2.27 g/cc was included for computing the values in Table 1, and the sulfur density was assumed to be 2 g/cc. The polysulfide redox electrode was taken to be a 5 M sulfur solution in DOL/DME=1:1 vol with a density of 1:12 g/cc. In Table 1, it is seen that with no added S—C composite electrode, the 5 M Li polysulfide solution electrode alone provided a specific energy of 418 Wh/kg and energy density of 460 Wh/L for the polysulfide-Li metal couple. Upon adding just 20 volume % of the solid storage material, the specific energy nearly tripled. Such semi-solids could be easily prepared so as to be highly flowable, and could therefore by used in flow battery architectures.

TABLE 1

The energy density of cathode-Li metal couples in which the cathode had the specified volume percent of S—C composite. "Semi-Solid" indicates a suspension electrode in which the liquid phase did not include redox storage. Semi-Solid + polysulfide indicate cathodes that were suspensions of the S—C composite in a 5M polysulfide redox solution.

| S—C composite Volume percent (%) | Semi-Solid (Wh/kg) | Semi-Solid (Wh/L) | Semi-Solid + Polysulfide (Wh/kg) | Semi-Solid + polysulfide (Wh/L) |
|---|---|---|---|---|
| 0 | 0 | 0 | 418 | 460 |
| 20 | 981 | 1105 | 1210 | 1324 |
| 40 | 1590 | 1775 | 1718 | 1884 |
| 60 | 2005 | 2226 | 2072 | 2278 |
| 80 | 2306 | 2549 | 2332 | 2568 |
| 98 | 2513 | 2770 | 2513 | 2772 |

Na Metal/NASICON Membrane/$Na^+$, $Fe(CN)_6^{4+}$ Aqueous Electrolyte+$Na_xMN(CN)_6$ (M or N=Fe, Ni, Co, Mn, Cu, Zn, Ti, V, Cr, Zr) Solid Storage Particles+Carbon Additive In this example, Na metal was the anode, a NASICON membrane was used to provide Na ion conduction while separating the anode and cathode, and the cathode was a semi-solid that comprised a redox active solution electrode of $Na^+$, $Fe(CN)_6^{4+}$, in which was suspended particles of solid storage compound in the family $Na_xMN(CN)_6$ (M or N=Fe, Ni, Co, Mn, Cu, Zn, Ti, V, Cr, Zr). Carbon nanoparticles were added in order to form a percolating electronically conductive network.

EXAMPLE 4

The next generation of low-cost, high-performance batteries is designed and demonstrated by developing the structure processing property performance relations for new battery couples. Two central principles are that batteries should be cheaper (<$100/kWh) and more energy dense (>500 Wh/L, >400 Wh/kg).

Figure 13:
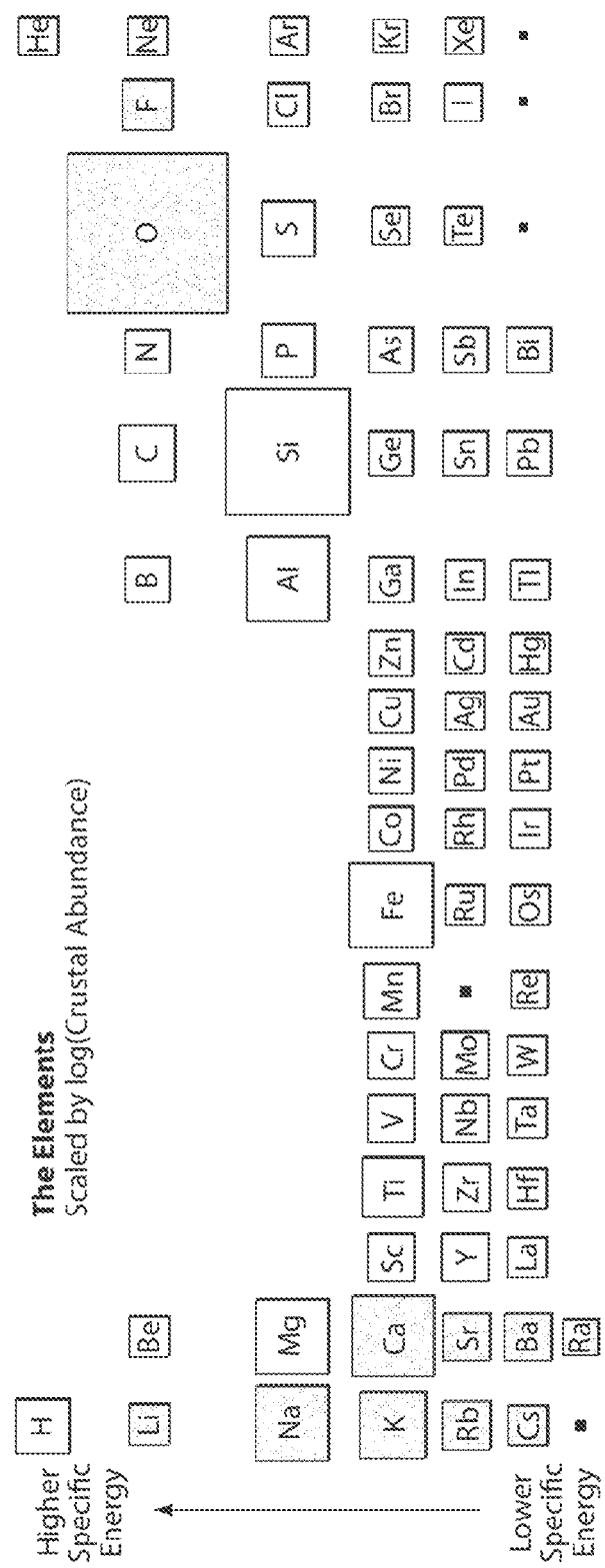
FIG. 13 provides a periodic table showing the relative abundance of elements in the Earth's crust, along with the relative electronegativity of elements.

Several new battery chemistries were identified based on low-cost couples of earth-abundant materials (FIG. 13). Specifically, the Mg—S, Al—S, and Zn—S electrochemical couples are attractive for low-cost, high energy density batteries. Sulfur is cheap, abundant and light, providing these couples with high theoretical energy density. Additionally, Mg, Al, and Zn metals can all be used as negative electrodes, eliminating dilutive effects at the negative electrode.

Figure 14:
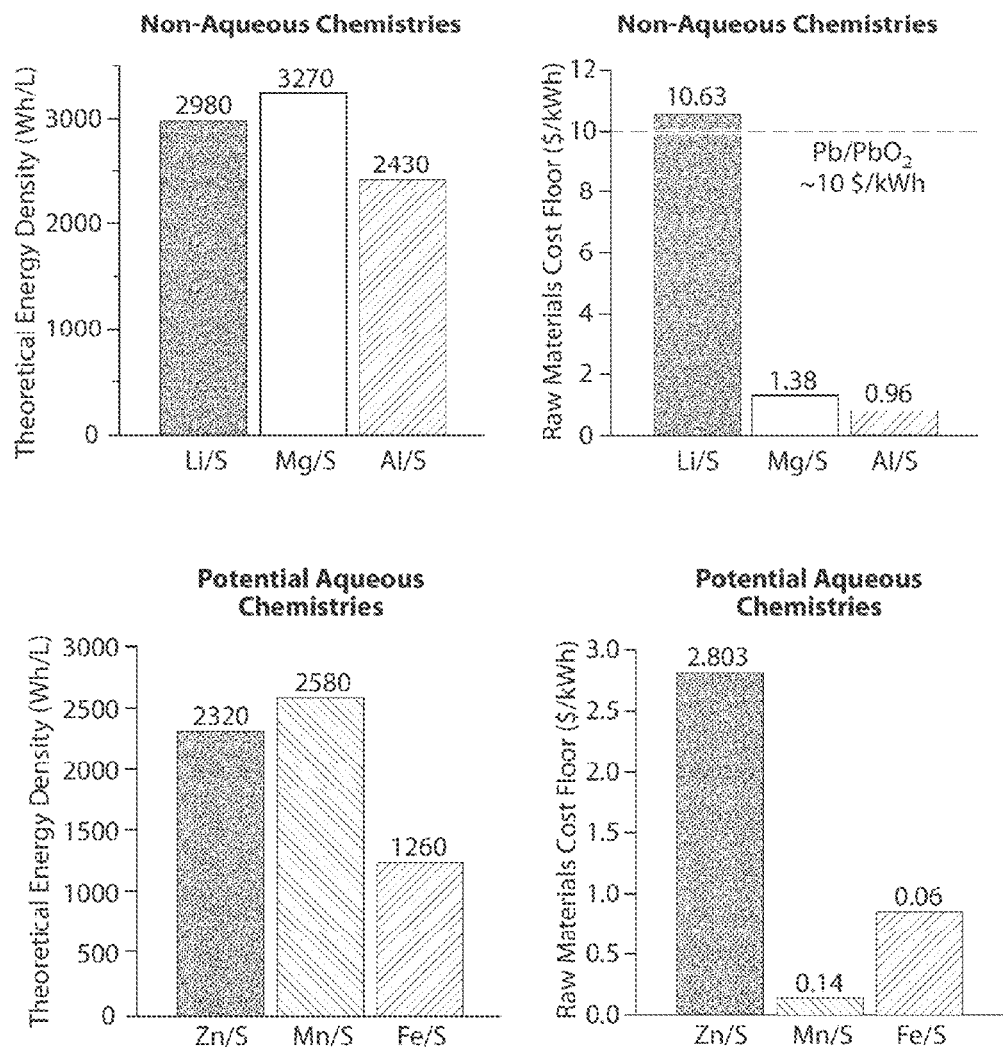
FIG. 14 provides graphs comparing the theoretical energy density and raw materials cost floor for Li/S, Mg/S, Al/S, Zn/S, Mn/S, and Fe/S couples.

Sulfur is cheap and abundant, and many metal sulfide formation reactions have high energy density, characteristics which make sulfur a desirable positive electrode material. FIG. 14 shows the theoretical energy density and raw materials costs of selected sulfide formation reactions $xM+yS \rightarrow M_xS_y$. The top figures compare electrochemical couples requiring non-aqueous electrolytes, while the bottom figures compare three couples which could potentially use an aqueous electrolyte.

Among the non-aqueous couples, the Mg—S couple is particularly attractive due to its high theoretical energy density (>3000 Wh/L), low raw materials cost (<$1.50/k Wh), and the demonstrated reversibility of metallic Mg electrodes in certain electrolyte solutions. To contextualize this, the Mg—S couple has lower raw materials cost than a lead acid battery and theoretical energy density similar to the most advanced lithium-ion couples.

The Li/S couple has been extensively researched for over 20 years, and is beginning to see limited commercialization, thanks in large part to its tremendous specific energy (gravimetric energy). While many challenges remain, several are particular to the lithium metal electrode, and not applicable to the Mg—S system. Most importantly, reversible and safe Mg metal electrodes have been demonstrated in certain electrolyte solutions. The viability of a metallic negative electrode opens the possibility of achieving high cell-level energy density and also reduces the number of supporting components used in a cell.

One challenge to developing a rechargeable Mg—S battery is identifying an electrolyte solution that is stable with Mg metal and sulfur. Certain components of the baseline Mg electrolytes are chemically incompatible with sulfur; however, the solvents and the electrochemically active salt are stable with sulfur. Two additional challenges common to all sulfur-based couples include shutting off the polysulfide shuttle, employing any of the strategies developed for Li—S batteries, including use of a solid (polymer or ceramic) electrolyte or surface coatings; and providing an electronically conductive network in the sulfur electrode.

Equimolar mixtures of $Mg[N(SO_2CF_3F)_2]_2$ (also known as $Mg(TFSI)_2$) and a linear ether (glymes, e.g. triglyme or tetraglyme) can be used as electrolyte solutions for Mg—S batteries. These equimolar mixtures form complexes $[Li(glyme)]^+$, and no free glyme is available to solvate polysulfide species. There is evidence that the TFSI anion can be stabilized against Mg metal electrodes, and glyme solvents do not form a passivating layer of Mg metal. Alternatively, the prospects are good for developing solid electrolytes; Mg-conducting gel polymer electrolytes have been demonstrated with conductivities up to 2.67 mS cm$^{-1}$.

There are several other possible polyvalent sulfur systems with low-cost and high energy density, as shown in FIG. 14. Recent developments efforts toward Zn-ion, Zn-air, and Al-ion batteries have demonstrated renewed interest in the zinc and aluminum metal electrodes for secondary batteries; sulfur is an attractive positive electrode that pairs with these metals to yield low-cost, high energy density couples. Stable cycling of a metallic zinc anode has been demonstrated in mild $ZnSO_4$ or $Zn(NO_3)_2$ aqueous electrolytes. As the potential of a sulfur electrode falls within the electrochemical stability window of these aqueous environments (1.06 V vs. $Zn^{2+}/Zn$), an aqueous Zn—S system is a viable target. A non-aqueous Al—S system may be with reach: metallic aluminum negative electrodes can cycle reversibly in an ionic liquid electrolyte (1-ethyl-3-methylimidazolium chloride w/ $AlCl_3$ salt).

Flow batteries use flowable electrodes ("catholyte" and anolyte") to decouple the power (rate-capability) and energy storage of a battery chemistry. This architecture provides greater flexibility in designing large-scale energy storage applications and reduces the relative fraction of cost coming from power-related components. Aqueous flow batteries have been of interest for stationary applications due to their scalability, safety, and relatively low cost ($250-$450/k Wh depending on the specific chemistry). However, the chemistries used in conventional aqueous flow batteries have low energy density of ~40 Wh L$^{-1}$ for the fluids (catholyte and anolyte) alone. New chemistries can enable high-energy density flow batteries.

The high solubility of reduced polysulfide species ($S_n^{-2}$ 2 less than or equal to n less than or equal to 8) in many non-aqueous solvents is a long-standing problem. Lithium polysulfides $Li_2S_n$ n can be dissolved at concentrations up to 10 mol S/L in THF and DMSO. At a 10 M concentration, the Mg-polysulfide system has a theoretical energy density of 833 WH/L, more than twenty times greater than conventional aqueous flow electrolytes. Even in a semi-flow configuration (one flowable electrode, one stationary), the Mg-polysulfide system is attractive for battery vehicle application: the active materials required for a 23 k Wh pack—enough for 300 miles all-electric range—occupy 33 L, approximately half the volume of a gasoline fuel tank in a passenger vehicle. These energy densities are several times higher than those of the lower concentration (2-4 M) aqueous polysulfide solutions which were explored as the anolyte of sodium bromide—sodium polysulfide flow batteries.

Metal Sulfide Formation Reactions:

$xM+yS \rightarrow M_xS_y$

Energetics estimated from reaction enthalpies (more accessible than free energies). Cost analysis following the Wadia/Albertus/Srinivasan methodology, and raw material prices from most recent USGS Mineral commodity survey.

| Chemistry | Average cell voltage (V) | Theoretical specific energy (Wh/Kg) | Theoretical energy density (Wh/L) | Raw materials cost floor ($/k Wh) |
|---|---|---|---|---|
| $Li_2S$ | 2.32 | 2700 | 4490 | 10.633 |
| $Na_2S$ | 1.90 | 1300 | 2420 | 0.297 |
| $Al_2S_3$ | 1.12 | 1200 | 2430 | 0.959 |
| ZnS | 1.06 | 580 | 2400 | 2.803 |
| MgS | 1.79 | 1710 | 4570 | 1.381 |
| MnS | 1.11 | 680 | 2730 | 0.137 |
| $TiS_2$ | 1.05 | 1010 | 3250 | 1.165 |
| $FeS_2$ | 0.45 | 400 | 1950 | 0.856 |

Mg—S

Advantages over Li—S. 1) Mg metal electrode is more stable than Li metal electrode. In principle, do not need to develop a Mg-ion sulfur cell. 2) As a result, can achieve higher practical energy density (Wh/L). 3) Potentially much lower cost—raw materials~⅛ as costly.

Challenges: 1) Identify an electrolyte solution that is stable with both Mg metal and sulfur (Aurbach's baseline electrolytes are incompatible with sulfur); 2) Address polysulfide solubility; 3) Provide electronic conductivity to make sulfur electrode active.

Possible electrolyte solutions: equimolar $Mg(TFSI)_2$ salt-glyme complex solutions. TFSI anion is stable with respect to Mg metal. Glyme solutions do not form passivating layer on Mg metal.

Zn—S

Zn electrode can cycle in a number of different electrolytes, including a mild acidic aqueous electrolyte (pH~4). The potential window for a hypothetical aqueous Zn—S battery sits within the stability window of an aqueous electrolyte.

Al—S

It may be possible to couple the Al anode to a S cathode.

Polysulfide Catholyte Flow Battery

Polysulfide solubility has been a key problem preventing practical implementation of Li/S batteries. The idea here is to flip that problem on its head and embrace that high solubility. A back of the envelope calculation goes as follows: Assume you can get ⅞ of the energy density of the full metal-sulfur reaction by cycling the polysulfides (sulfur starts as $S_8$ rings which are reduced downward to the eventual $M_xS$ product) but you don't go all the way to insoluble products (e.g. $Li_2S$ or MgS). If you can get 10 M polysulfide concentrations, this puts you at 833 Wh/L flowable catholyte energy density for the hypothetical Mg system. It would be advantageous to do this with a stable cycling metallic anode (i.e. not Li).

Sulfide Displacement/Conversion Cathodes $M_xS_y + yN \rightarrow xM + yNS$

With, e.g., Mg working ion $FeS_2 + 2Mg \rightarrow Fe + 2MgS$ −520 kJ/mol Average voltage=1.35 V $MnS_2 + 2Mg \rightarrow Mn + 2MgS$ −485 kJ/mol Average voltage=1.26 V $MnS + Mg \rightarrow Mn + MgS$ −132 kJ/mol Average voltage=0.68 V $ZnS + Mg \rightarrow Zn + MgS$ −141 kJ/mol Average voltage=0.73 V $Li/FeS_2$ is a primary cell chemistry that operates by a two-step reaction $2Li + FeS_2 \rightarrow Li_2FeS_2$ intercalation $2Li + Li_2FeS_2 \rightarrow Fe + 2Li_2S$ conversion

EXAMPLE 5

A Mg-sulfide electrode and battery according certain aspects of the invention was demonstrated as follows. The electrode was made from the following starting materials: magnesium sulfide (MgS) and elemental sulfur (S) were mixed in a stoichiometric ratio of 1:5 and dissolved in 10 mL of triglyme by stirring for 12 h in an argon-filled glovebox. The resulting concentration of dissolved sulfur in the solution was 1 M. Next, supporting electrolyte salt was dissolved in the solution, the salt being a 1:1 molar mixture of $MgCl_2$ and $AlCl_3$, i.e. a salt complex of $MgAlCl_5^-$. This salt was added to achieve a supporting electrolyte concentration of 0.5 M. To the resulting catholyte solution, 2 vol % carbon black was added to achieve high electronic conductivity. The resulting suspension was mixed by hand and sonicated for a period of 1 h. The resulting electrode was electrochemically tested in a Swagelok cell, using stainless steel current collectors. The electrode was contained in a well with a diameter of 8 mm and a depth of 500 microns. The negative electrode was a disk of elemental magnesium metal with a diameter of 12 mm. The cell was cycled at constant C-rates of C/20, C/10, C/5, C/2, etc. between voltage limits of 0.5 V and 2.2 V.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrode, comprising:
   a sulfur or metal sulfide active material suspended or dissolved in a fluid; and
   a percolating conductive network comprising electronically conductive particles suspended in the fluid, wherein the electronically conductive particles are electronically connected, and wherein electronic charge carriers can be transported throughout the percolating conductive network via the electronically conductive particles.

2. The electrode of claim 1, wherein the electronically conductive particles comprise carbon.

3. The electrode of claim 1, wherein the metal sulfide comprises a lithium sulfide, a magnesium sulfide, a zinc sulfide, a sodium sulfide, or combinations thereof.

4. The electrode of claim 1, wherein the fluid comprises dimethoxyethane (DME).

5. The electrode of claim 1, wherein the fluid comprises dioxolane (DOL).

6. The electrode of claim 1, wherein the electrode composition comprises sulfur infiltrated into mesoporous carbon.

7. The electrode of claim 1, comprising lithium bis (Trifluoromethanesulfonyl)Imide (LiTFSI).

8. A battery comprising the electrode of claim 1.

9. The battery of claim 8, further comprising a second electrode.

10. The battery of claim 9, wherein the second electrode comprises an active material comprising lithium.

11. The battery of claim 9, wherein the second electrode comprises lithium metal.

12. The battery of claim 9, wherein the second electrode is a stationary electrode.

13. The battery of claim 9, wherein the second electrode is a flow electrode.

* * * * *

UNITED STATES PATENT AND TRADEMARK OFFICE
CERTIFICATE OF CORRECTION

PATENT NO. : 9,583,779 B2
APPLICATION NO. : 14/172648
DATED : February 28, 2017
INVENTOR(S) : Yet-Ming Chiang et al.

Page 1 of 1

It is certified that error appears in the above-identified patent and that said Letters Patent is hereby corrected as shown below:

At item (71), Applicant should be listed as follows:
Applicant: --Massachusetts Institute of Technology, Cambridge, MA (US)--

Signed and Sealed this
Twenty-first Day of November, 2017

Joseph Matal
*Performing the Functions and Duties of the
Under Secretary of Commerce for Intellectual Property and
Director of the United States Patent and Trademark Office*